(12) United States Patent
Kinoshita et al.

(10) Patent No.: US 8,955,019 B2
(45) Date of Patent: Feb. 10, 2015

(54) NETWORK SYSTEM, SERVER APPARATUS, TERMINAL APPARATUS, DISPLAY METHOD OF CONTENT GUIDE, PROGRAM FOR SERVER APPARATUS, PROGRAM FOR TERMINAL APPARATUS

(75) Inventors: Akihiko Kinoshita, Tokyo (JP); Takashi Kanao, Tokyo (JP); Hiroyuki Chiba, Kanagawa (JP); Tsuyoshi Honma, Chiba (JP); Hirofumi Kouda, Saitama (JP)

(73) Assignee: Sony Corporation, Tokyo (JP)

( * ) Notice: Subject to any disclaimer, the term of this patent is extended or adjusted under 35 U.S.C. 154(b) by 649 days.

(21) Appl. No.: 11/938,481

(22) Filed: Nov. 12, 2007

(65) Prior Publication Data

US 2008/0184298 A1    Jul. 31, 2008

(30) Foreign Application Priority Data

Dec. 27, 2006    (JP) ................................ 2006-351888

(51) Int. Cl.
*G06F 3/00* (2006.01)
*G06F 13/00* (2006.01)
(Continued)

(52) U.S. Cl.
CPC ....... *H04N 7/17309* (2013.01); *H04N 5/44543* (2013.01); *H04N 5/765* (2013.01);
(Continued)

(58) Field of Classification Search
USPC ..................... 725/39–40, 68, 80, 91–92, 100, 725/114–115, 131–134, 138–142, 151–153
See application file for complete search history.

(56) References Cited

U.S. PATENT DOCUMENTS

| | | | | |
|---|---|---|---|---|
| 6,311,011 | B1 * | 10/2001 | Kuroda | ........................... 386/46 |
| 2003/0005454 | A1 * | 1/2003 | Rodriguez et al. | .............. 725/89 |

(Continued)

FOREIGN PATENT DOCUMENTS

| | | |
|---|---|---|
| EP | 1 133 088 A1 | 9/2001 |
| EP | 1 551 176 A2 | 7/2005 |

(Continued)

OTHER PUBLICATIONS

Office Action issued Jul. 12, 2011, in Japanese Patent Application No. 2006-351888.
(Continued)

*Primary Examiner* — Yassin Alata
(74) *Attorney, Agent, or Firm* — Oblon, Spivak, McClelland, Maier & Neustadt, L.L.P.

(57) ABSTRACT

A network system in which a terminal apparatus, a recording apparatus, and a server apparatus are connectable via a network is disclosed. The server apparatus includes a service processing unit performing a service of reserving recording of a content to the recording apparatus by a request from the terminal apparatus, and an available service information provision unit managing information on the service available to the recording apparatus as available service information and transmitting the available service information to the terminal apparatus in response to a request from the terminal apparatus. The terminal apparatus includes a content guide acquisition unit acquiring a content guide which lists information to guide watching and listening of a plurality of contents, an available service information acquisition unit acquiring the available service information from the server apparatus, and a content guide display processing unit processing the content guide acquired by the content guide acquisition unit based on the available service information acquired by the available service information acquisition unit and displaying the processed one.

15 Claims, 15 Drawing Sheets

(51) Int. Cl.
*H04N 5/445* (2011.01)
*H04N 7/173* (2011.01)
*H04N 5/765* (2006.01)
*H04N 21/4227* (2011.01)
*H04N 21/433* (2011.01)
*H04N 21/472* (2011.01)
*H04N 5/775* (2006.01)
*H04N 5/781* (2006.01)
*H04N 5/85* (2006.01)
*H04N 5/907* (2006.01)

(52) U.S. Cl.
CPC ....... *H04N21/4227* (2013.01); *H04N 21/4334* (2013.01); *H04N 21/47214* (2013.01); *H04N 5/775* (2013.01); *H04N 5/781* (2013.01); *H04N 5/85* (2013.01); *H04N 5/907* (2013.01)
USPC .................. 725/58; 725/39; 725/40; 725/68; 725/80; 725/91; 725/92; 725/100; 725/114; 725/115; 725/131; 725/132; 725/133; 725/134; 725/138; 725/139; 725/140; 725/141; 725/142; 725/151; 725/152; 725/153

(56) References Cited

U.S. PATENT DOCUMENTS

| | | | |
|---|---|---|---|
| 2005/0097605 A1* | 5/2005 | Itou | 725/45 |
| 2005/0108769 A1* | 5/2005 | Arnold et al. | 725/115 |
| 2005/0144644 A1* | 6/2005 | Hirota | 725/90 |
| 2005/0160461 A1* | 7/2005 | Baumgartner et al. | 725/52 |
| 2005/0267994 A1* | 12/2005 | Wong et al. | 709/246 |
| 2006/0059522 A1 | 3/2006 | Huang | |
| 2007/0192793 A1* | 8/2007 | Song et al. | 725/39 |

FOREIGN PATENT DOCUMENTS

| | | |
|---|---|---|
| JP | 2001-238157 | 8/2001 |
| JP | 2001-339696 | 12/2001 |
| JP | 2005-191950 | 7/2005 |

OTHER PUBLICATIONS

Summons to attend oral proceedings pursuant to Rule 115(1) EPC issued Sep. 24, 2012, in European Patent Application No. 07123989.1.

Official Communication issued Apr. 15, 2013 in European Application No. 07 123 989.1.

* cited by examiner

FIG.9

A40 Available Service Information

| Controlled Device Management ID | Device Name | Available Service |
|---|---|---|
| 0123 | Recording Apparatus A (Recording Apparatus 600-A) | Remote Recording Reservation |
| 4567 | Recording Apparatus B (Recording Apparatus 600-B) | Remote Download Reservation |
| 8901 | Recording Apparatus C (Recording Apparatus 600-C) | Remote Recording Reservation Remote Download Reservation |

REC : For broadcast program, remote recording reservation is allowed

For program promotion, remote recording reservation of program to be promoted is allowed DL : remote download reservation is allowed

NETWORK SYSTEM, SERVER APPARATUS, TERMINAL APPARATUS, DISPLAY METHOD OF CONTENT GUIDE, PROGRAM FOR SERVER APPARATUS, PROGRAM FOR TERMINAL APPARATUS

CROSS REFERENCES TO RELATED APPLICATIONS

The present invention contains subject matter related to Japanese Patent Application JP 2006-351888 filed in the Japanese Patent Office on Dec. 27, 2006, the entire contents of which being incorporated herein by reference.

BACKGROUND OF THE INVENTION

1. Field of the Invention

The present invention relates to a network system capable of reserving recording of a content from a terminal apparatus to a recording apparatus via a network, a server apparatus, a terminal apparatus, a display method of a content guide, a program for a server apparatus, and a program for a terminal apparatus.

2. Description of the Related Art

In recent years, a service to provide an EPG (Electronic Program Guide) covering so-called "net programs" which are broadcast programs of analog terrestrial television broadcasting, digital terrestrial television broadcasting, CS digital broadcasting, BS digital broadcasting, and so on and contents provided from program delivery services-sites on the Internet has become widespread.

Further, as another service which cooperates with the EPG, a remote recording reservation service of reserving recording of a program selected in the EPG displayed on a display of a terminal apparatus to a recording apparatus connected to a network is known. When receiving a remote recording reservation request from the terminal apparatus via the network, a server which performs the remote recording reservation service transmits recording reservation information such as a channel name, a broadcast date, broadcast start/end times, and a title on a program to be recorded to a recording apparatus previously associated with the terminal apparatus. The recording apparatus receives and records the broadcast program based on the recording reservation information received from the server (see Patent Document 1, for example).

(Patent Document 1)
Japanese Patent Application Laid-Open No. 2001-309285

SUMMARY OF THE INVENTION

A remote recording reservation service is a service in which an object to be recorded is limited to a broadcast content. Meanwhile, a remote download reservation service is being studied. In this service, a server receives a remote download reservation request from a terminal apparatus and transmits remote download reservation information such as a place and a file name of a file to be downloaded to a recording apparatus associated with the terminal apparatus. The recording apparatus downloads the target file based on the remote download reservation information received from the server. Namely, the remote recording reservation service mainly covers broadcast contents, whereas the remote download reservation service covers VoD (Video on Demand) programs, files, and so on.

So far, the mainstream of content guides represented by the EPG and the like has covered only contents corresponding to a single service. However, to allow various forms of contents such as broadcast contents, VoD programs, and files to be recorded to the recording apparatus by selectively using a plurality of services, information on contents corresponding to different services are typically mixed in the content guide.

On the other hand, to allow the contents to be recorded to the recording apparatus by selectively using the plurality of services, it becomes an indispensable condition that the recording apparatus is allowed to use any of the services. However, depending on various conditions such as the presence or absence of a broadcast receiving unit and the presence or absence of software corresponding to communication bands and the services, some recording apparatuses are enabled to use the remote recording reservation service but disabled to use the remote download reservation service, in contrast, some are enabled to use the remote download reservation service but disabled to use the remote recording reservation service, some are enabled to use both of the remote recording reservation and remote download reservation services, and some are disabled to use either of the services. In the content guide, such constraints on the recording apparatus side are not reflected, so when a user selects a content on the content guide, the user himself or herself has to consider the constraints on the recording apparatus side, which imposes a burden on the user.

In view of the above circumstances, it is desirable to provide a network system, a server apparatus, a terminal apparatus, a display method of a content guide, a program for a server apparatus, and a program for a terminal apparatus capable of improving the efficiency and operability when the user selects a content to be an object of the use of the service such as the remote recording reservation or the remote download reservation on the content guide.

According to an embodiment of the present invention, there is provided a network system in which a terminal apparatus, a recording apparatus, and a server apparatus are connectable via a network. The server apparatus includes a service processing unit performing a service of reserving recording of a content to the recording apparatus by a request from the terminal apparatus, and an available service information provision unit managing information on the service available to the recording apparatus as available service information and transmitting the available service information to the terminal apparatus in response to a request from the terminal apparatus. The terminal apparatus includes a content guide acquisition unit acquiring a content guide which lists information to guide watching and listening of a plurality of contents, an available service information acquisition unit acquiring the available service information from the server apparatus, and a content guide display processing unit processing the content guide acquired by the content guide acquisition unit based on the available service information acquired by the available service information acquisition unit and displaying the processed one.

According to the embodiment of the present invention, in the terminal apparatus, a content guide in which contents corresponding to the service available to the recording apparatus are identifiable can be created and displayed.

In the terminal apparatus according to the embodiment of the present invention, the content guide display processing unit may create a content guide in which contents corresponding to the service available to the recording apparatus are identifiable by the processing. Consequently, the efficiency and operability when the user selects a content to be the object of the use of the service such as the remote recording reservation or the remote download reservation on the content guide improve.

Further, a plurality of the recording apparatuses may be allowed to be connected to the network, and the content guide display processing unit may create a content guide in which contents corresponding to the service available to each of the recording apparatuses are identifiable by the processing. Consequently, even when the user specifies the recording apparatus and wants to use the service such as the remote recording reservation or the remote download reservation, the efficiency and operability when the user selects a content to be the object of the use of the service improve.

Furthermore, the content guide display processing unit may create a content guide in which display of only contents corresponding to the service available to the recording apparatus is enabled by the processing. This can prevent a non-corresponding content from being mistakenly selected by the user.

Moreover, a plurality of the recording apparatuses may be allowed to be connected to the network, and the content guide display processing unit may create a content guide clearly demonstrating the recording apparatus that is enabled to use the service corresponding to each of the contents by the processing. Consequently, the efficiency and operability when the user selects a significant content as the object of the use of the service such as the remote recording reservation or the remote download reservation improve. In addition, even when the user specifies the recording apparatus and wants to use the service such as the remote recording reservation or the remote download reservation, the efficiency and operability when the user selects a content to be the object of the use of the service improve.

A plurality of kinds of services to record a content on the network to the recording apparatus include a remote recording reservation and a remote download reservation.

The information listed in the content guide may include information to guide watching and listening of a plurality of contents whose corresponding services are different.

According to the embodiment of the present invention, the efficiency and operability when the user selects a content to be the object of the use of the service such as the remote recording reservation or the remote download reservation on the content guide can be improved.

BRIEF DESCRIPTION OF DRAWINGS

FIG. 9 is a diagram showing an example of available service information;

DESCRIPTION OF PREFERRED EMBODIMENTS

An embodiment of the present invention will be described below based on the drawings.

Figure 1:
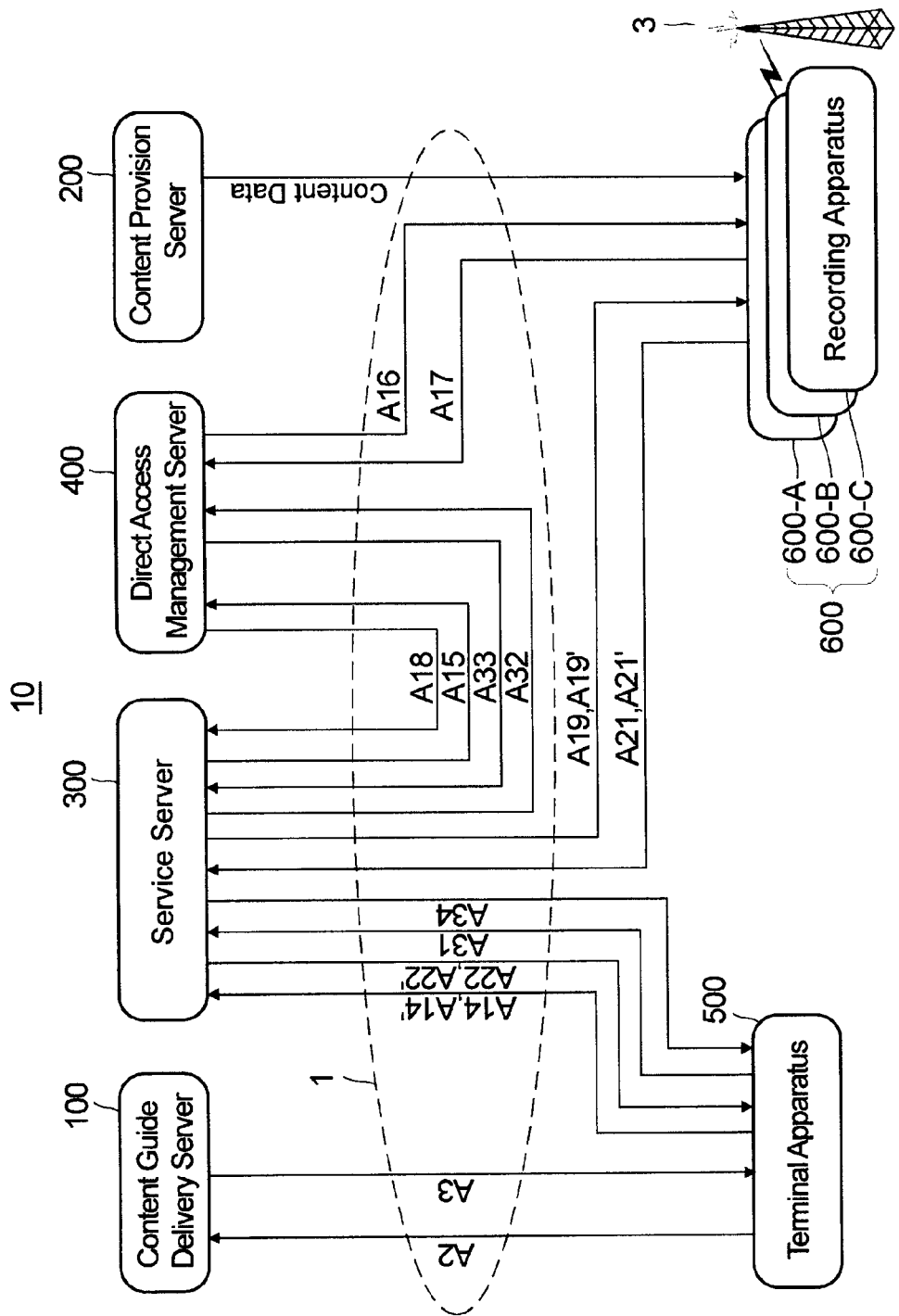
FIG. 1 is a diagram showing the entire configuration of a network system according to an embodiment of the present invention.

FIG. 1 is a diagram showing the entire configuration of a network system 10 according to the embodiment of the present invention.

This network system 10 includes a content guide delivery server 100, a content provision server 200, a service server 300, a direct access management server 400, a terminal apparatus 500, and a recording apparatus 600 (600-A, 600-B, 600-C), and they are made connectable so as to be intercommunicable via a network 1 such as the Internet.

The content provision server 200 is a server which delivers contents such as broadcast programs by IP multicast broadcasting and the like, VoD (Video on Demand) programs, music, still images, radio programs, programs, and data via the network 1. Incidentally, a plurality of content provision servers 200 may be connected to the network 1.

The content guide delivery server 100 is a server which stores a content guide listing information to guide watching and listening of contents provided by the content provision server 200 and a broadcast station 3 and, when receiving a content guide acquisition request A2 from the terminal apparatus 500 connected to the network 1, delivers the content guide as a content guide acquisition response A3 to the terminal apparatus 500 via the network 1.

The service server 300 is a server which upon receiving a remote recording reservation request A14 from the terminal apparatus 500, performs a remote recording reservation service to record a content such as a broadcast program provided by the content provision server 200 or the broadcast station 3 to the recording apparatus 600, and upon receiving a remote download reservation request A14' from the terminal apparatus 500, performs a remote download reservation service to record one of various contents such as the VoD programs, music, still images, radio programs, programs, and data provided by the content provision server 200.

The direct access management server 400 is a server which manages a correspondence between a combination of the terminal apparatus 500 and the service provided by the service server 300 and the recording apparatus 600, and performs processing regarding the transfer of information necessary for the service server 300 to directly access the recording apparatus 600 via the network 1. In this embodiment, the service server 300 provides a plurality of kinds of services such as the remote recording reservation and the remote download reservation from the terminal apparatus 500 to the recording apparatus 600, so that the direct access management server 400 manages at least a correspondence relation between a combination of the terminal apparatus 500 and the remote recording reservation service and the recording apparatus 600, a correspondence relation between a combination of the terminal apparatus 500 and the remote download reservation service and the recording apparatus 600, and the like. Further, the direct access management server 400 manages information on the service available to the recording apparatus 600 as available service information and can transmit the available service information to the terminal apparatus 500 via the service server 300.

The terminal apparatus 500 can transmit the content guide acquisition request A2 to the content guide delivery server 100 via the network 1, receive the content guide as the content guide acquisition response A3 from the content guide delivery server 100 and display it, and transmit the remote recording reservation request A14, the remote download reservation request A14', or the like of a content selected in the displayed content guide by a user to the service server 300.

Upon receiving a remote recording reservation instruction A19, a remote download reservation instruction A19', or the like from the service server 300, the recording apparatus 600 (600-A, 600-B, 600-C) can selectively receive and record a broadcast program delivered from the content provision server 200 or a broadcast program from the broadcast station 3, or download a content such as a VoD program or a file from the content provision server 200. According to its specification, the recording apparatus 600 (600-A, 600-B, 600-C) is one that is enabled to use only the remote recording reservation service, one that is enabled to use only the remote download reservation service, one that is enabled to use both of the remote recording reservation and remote download reservation services, one that is disabled to use either of the services, or the like.

Figure 2:
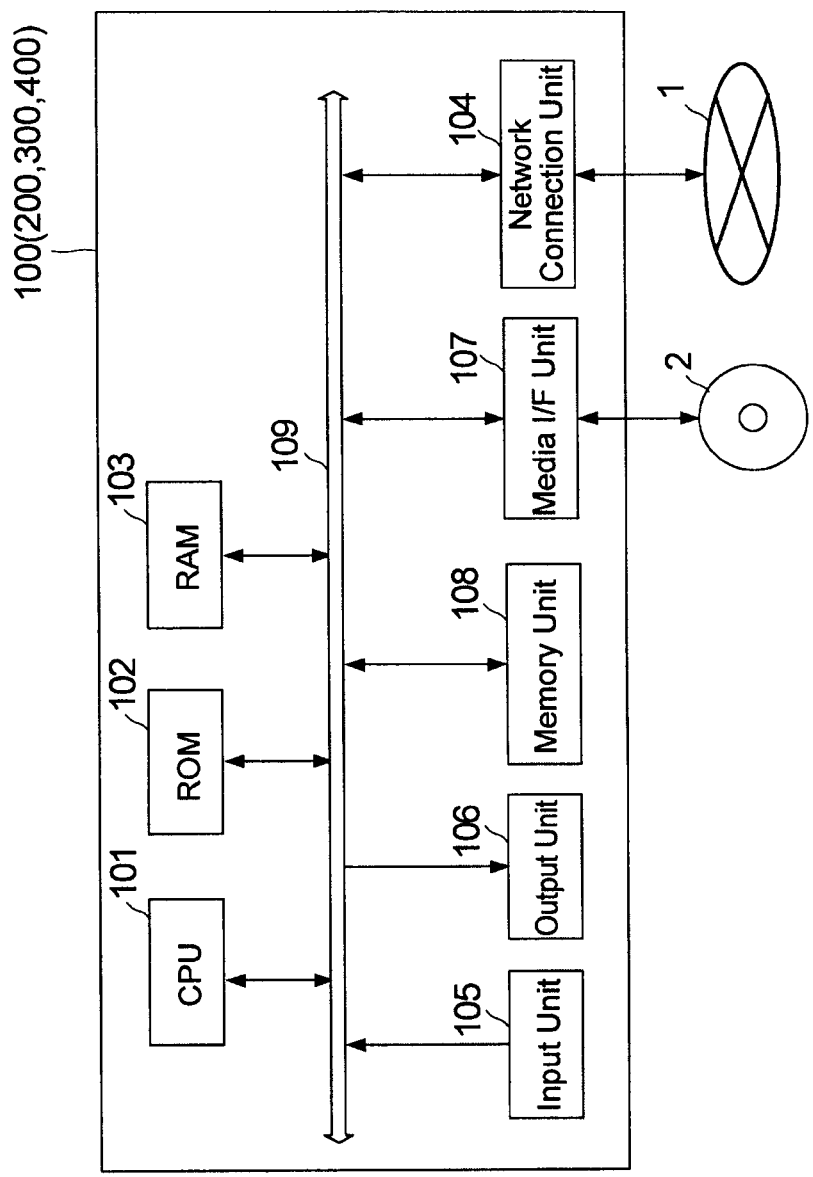
FIG. 2 is a block diagram showing the hardware configuration of a content guide delivery server, a content provision server, a service server, and a direct access management server.

For example, as shown in FIG. 2, any of the content guide delivery server 100, the content provision server 200, the service server 300, and the direct access management server 400 is constituted by a typical computer system such as a personal computer.

Namely, a ROM (Read Only Memory) 102, a RAM (Random Access Memory) 103, a network connection unit 104, an input unit 105 constituted by a keyboard, a mouse, and so on, an output unit 106 constituted by a display constituted by a CRT (Cathode Ray Tube), an LCD (Liquid Crystal Display), or the like and a speaker, a media interface unit 107, and a memory unit 108 constituted by a hard disk drive, a nonvolatile memory, or the like are connected to a CPU (Central Processing Unit) 101 via a system bus 109.

The network connection unit 104 is a means for performing communication processing via the network 1. A program for software processing, various data, and so on are stored in the memory unit 108. To perform the software processing, the CPU 101 loads the program from the memory unit 108 into the RAM 103 and analyzes and executes the program. A removable medium 2 such as a magnetic disk, an optical disk, a magnetic optical disk, or a semiconductor memory is properly mounted in the media interface unit 107, and a program read therefrom is installed into the memory unit 108 as necessary.

Next, the software configuration of the service server 300 will be described using FIG. 3. The service server 300 includes an available service information provision unit 301 and a remote recording/download reservation processing unit 302.

When receiving an available service acquisition request A31 from the terminal apparatus 500, the available service information provision unit 301 transmits an available service acquisition request A32 including a control device•service management ID indicating the combination of the terminal apparatus 500 and the service to the direct access management server 400, receives available service information as an available service acquisition response A33 from the direct access management server 400, and further transmits the available service information as an available service acquisition response A34 to the terminal apparatus 500.

When receiving the remote recording reservation request A14 from the terminal apparatus 500, the remote recording/download reservation processing unit 302 transmits a direct access start request A15 requesting acquisition of a direct access URI which is information necessary for the service server 300 to directly access the recording apparatus 600 corresponding to the combination of this terminal apparatus 500 and the remote recording reservation service via the network 1 to the direct access management server 400, receives a direct access start response A18 including the direct access URI from the direct access management server 400, based on this, accesses the recording apparatus 600 to transmit the remote recording reservation instruction A19, receives a remote recording reservation result notice A21 from the recording apparatus 600 after the completion of a recording reservation in the recording apparatus 600, and further transmits a remote recording reservation result notice A22 to the terminal apparatus 500.

Moreover, when receiving the remote download reservation request A14' from the terminal apparatus 500, the remote recording/download reservation processing unit 302 transmits the direct access start request A15 requesting acquisition of the direct access URI which is information necessary for the service server 300 to directly access the recording apparatus 600 corresponding to the combination of this terminal apparatus 500 and the remote download reservation service via the network 1 to the direct access management server 400, receives the direct access start response A18 including the direct access URI from the direct access management server 400, based on this, accesses the recording apparatus 600 to transmit the remote download reservation instruction A19', receives a remote download reservation result notice A21' from the recording apparatus 600 after the completion of a download reservation in the recording apparatus 600, and further transmits a remote download reservation result notice A22' to the terminal apparatus 500.

Next, the software configuration of the direct access management server 400 will be described using FIG. 4. The direct access management server 400 includes a control device•service/controlled device management ID storage unit 411, a registration processing unit 412, a direct access request processing unit 413, and an available service information provision unit 415.

In the control device•service/controlled device management ID storage unit 411, a control device•service management ID being an ID given to the combination of the terminal apparatus 500 as a control device and the service of the service server 300 and a controlled device management ID being an ID assigned to the recording apparatus 600 as a controlled device are stored while being linked to each other. Further, information on services available to the respective recording apparatuses 600 (600-A, 600-B, 600-C) is also stored in the control device•service/controlled device management ID storage unit 411.

The registration processing unit 412 registers the control device•service management ID and the controlled device management ID to the control device•service/controlled device management ID storage unit 411 and links both the IDs. Namely, the registration processing unit 412 generates the control device•service management ID with respect to the combination of the terminal apparatus 500 and the service provided by the service server 300, for example, in response to a control device•service registration request C1 from the service server 300, registers the control device•service management ID in the control device•service/controlled device management ID storage unit 411, and transmits this ID to the service server 300 via the network 1. In this embodiment, the service server 300 provides at least two services of the remote recording reservation and the remote download reservation, and therefore the control device•service management ID indicating the combination of the terminal apparatus 500 and the remote recording reservation service and the control device•service management ID indicating the combination of the terminal apparatus 500 and the remote download reservation service are generated.

Further, in response to a controlled device registration request C2 from each recording apparatus 600 (600-A, 600-B, 600-C), the registration processing unit 412 generates an individual controlled device management ID with respect to the recording apparatus 600 (600-A, 600-B, 600-C), stores this ID in the control device•service/controlled device management ID storage unit 411 in correspondence with the control device•service management ID, and transmits this ID to the recording apparatus 600 via the network 1. Here, among methods for determining to which control device•service management ID the controlled device management ID is to correspond, there is the following method of using a password for controlled device registration.

In this method, after the control device•service management ID is registered with the direct access management server 400, the service server 300 requests the direct access management server 400 to issue the password for controlled device registration. When receiving this request, the direct access management server 400 generates the password for controlled device registration and transmits it to the service server 300 while storing it in correspondence with the control device•service management ID. The service server 300 transmits the password for controlled device registration to the terminal apparatus 500. The terminal apparatus 500 transfers the acquired password for controlled device registration to the recording apparatus 600 using an optical communication unit 511 (see FIG. 5). The recording apparatus 600 adds the password for controlled device registration to the controlled device registration request C2 and transmits it to the direct access management server 400. When receiving the controlled device registration request C2, the direct access management server 400 generates the controlled device management ID, compares the password for controlled device registration included in the controlled device registration request C2 to the password for controlled device registration stored in correspondence with the control device•service management ID, and if both the passwords match, stores the control device•service management ID corresponding to the matched password for controlled device registration in the control device•service/controlled device management ID storage unit 411 in correspondence with the generated controlled device management ID.

The available service information provision unit 415 acquires the information on the service available to each recording apparatus 600 (600-A, 600-B, 600-C) from each recording apparatus 600 (600-A, 600-B, 600-C) and stores it in the control device•service/controlled device management ID storage unit 411 in correspondence with the controlled device management ID of the recording apparatus 600. The timing when the available service information is acquired from each recording apparatus 600 (600-A, 600-B, 600-C) is considered to be set, for example, every time a bidirectional always-on connection session is established between the recording apparatus 600 and an XMPP server 414 described later in the direct access management server 400, after the controlled device management ID of the recording apparatus 600 is registered, or the like. Incidentally, regarding the acquisition of the available service information, the available service information may be actively transmitted from the recording apparatus 600 to the direct access management server 400.

Further, when receiving the available service acquisition request A32 including the control device•service management ID from the service server 300, the available service information provision unit 415 retrieves the available service information of each recording apparatus 600 (600-A, 600-B, 600-C) from the control device•service management ID included in the available service acquisition request A32 and the information stored in the control device•service/controlled device management ID storage unit 411, and transmits a result of this retrieval as the available service acquisition response A33 to the service server 300. Namely, the available service information provision unit 415 determines all the controlled device management IDs linked with the control device•service management ID included in the available service acquisition request A32 and transmits the available service information corresponding to each of these controlled device management IDs as the available service information of each of the recording apparatuses 600 (600-A, 600-B, 600-C) to the service server 300.

When receiving the direct access start request A15 including the control device•service management ID from the service server 300, with reference to the control device service management ID included in the direct access start request A15 and the contents of links between the control device•service management IDs and the controlled device management IDs stored in the control device•service/controlled device management ID storage unit 411, the direct access request processing unit 413 determines the controlled device management ID linked with the control device•service management ID included in the direct access start request A15, transmits to the appropriate recording apparatus 600 via the network 1 a direct access information acquisition request A16 requesting acquisition of the direct access URI (Uniform Resource Identifier) being the information necessary for the service server 300 to directly access the recording apparatus 600 via the network 1, receives a direct access information acquisition response A17 including this direct access URI from the recording apparatus 600, and transmits the direct access start response A18 including this direct access URI to the service server 300.

Here, for example, when the recording apparatus 600 is connected to the network 1 via a router, the direct access URI is constituted, for example, by a global IP address and port number mapped to a local IP address and port number of the recording apparatus 600 in the router. Note, however, that when the recording apparatus 600 is directly connected to the network 1, the direct access URI may be a global IP address assigned to this recording apparatus 600.

Moreover, in this direct access management server 400, the XMPP (extensible Messaging and Presence Protocol) server 414 to set the bidirectional always-on connection session with the recording apparatus 600 is provided. XMPP is a protocol to realize real-time communication. The always-on connection session is set by the recording apparatus 600 logging in to the XMPP server 414 before the terminal apparatus 500 accesses the recording apparatus 600 via the network 1. When receiving the direct access start request A15 from the service server 300 which has established an XMPP session with the XMPP server 414, the direct access management server 400 transmits the direct access information acquisition request A16 to the recording apparatus 600 through the always-on connection session established between the XMPP server 414 and the recording apparatus 600.

Figure 5:
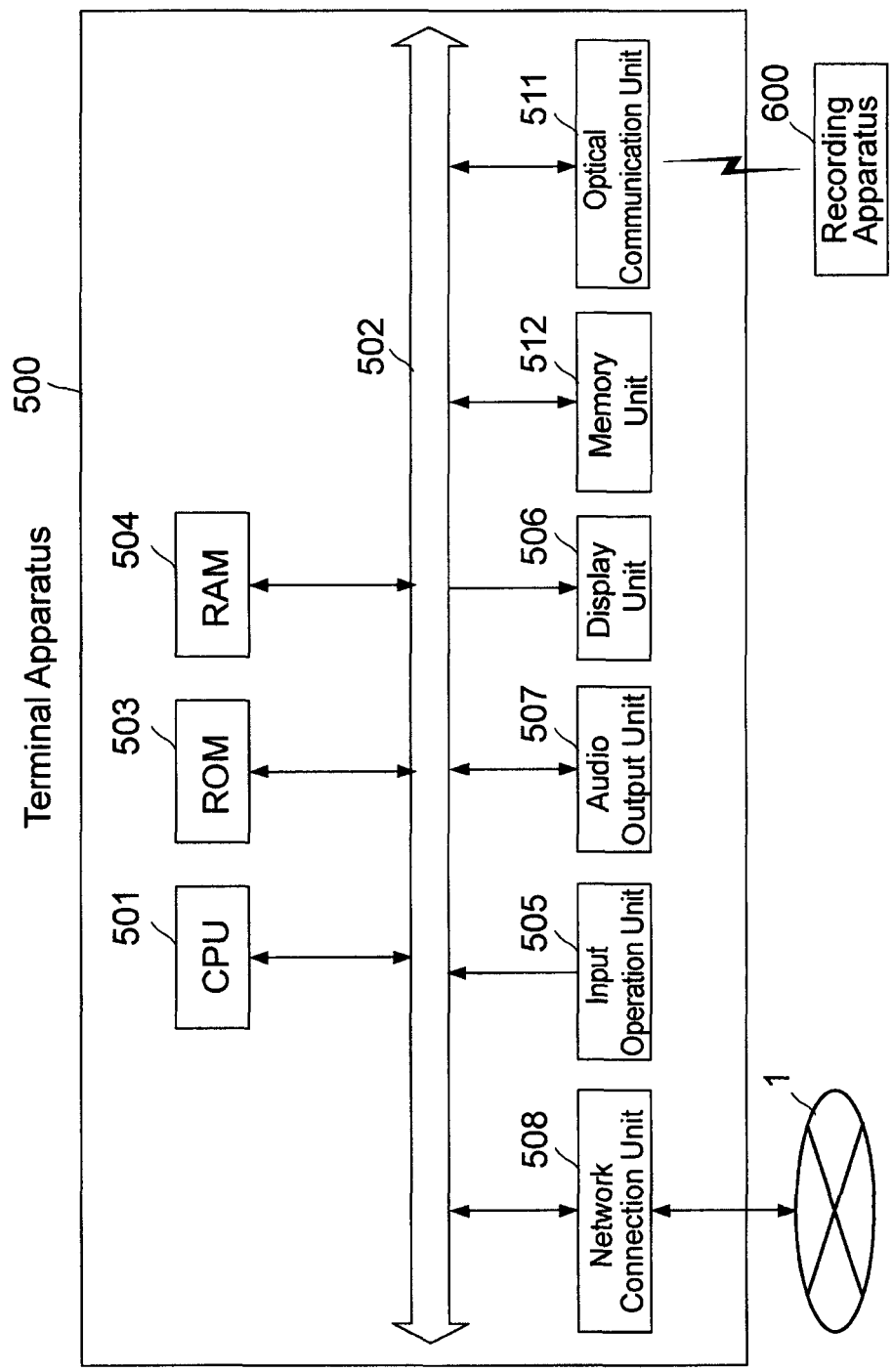
FIG. 5 is a block diagram showing the hardware configuration of a terminal apparatus.

Next, the terminal apparatus 500 will be described. FIG. 5 is a block diagram showing the hardware configuration of the terminal apparatus 500. As shown in this figure, a ROM 503, a RAM 504, an input operation unit 505, a display unit 506, an audio output unit 507, a network connection unit 508, the optical communication unit 511, and a memory unit 512 are connected to a CPU 501 via a system bus 502.

The input operation unit 505 includes various keys and so on, and processes inputs of various instructions and data from the user. The instructions inputted from the user by the input operation unit 505 are supplied to the CPU 501 through the system bus 502 by an input interface unit not shown.

The display unit 506 is constituted, for example, by a display such as an LCD and a display control circuit which drives the display, and displays, for example, the content guide acquired from the content guide delivery server 100.

The audio output unit 507 is constituted by a circuit which converts a digital audio signal into an analog audio signal, a speaker, and so on.

The network connection unit 508 processes a wired or wireless connection with the network 1.

The optical communication unit 511 is an interface to process communication with an external device such as the recording apparatus 600, and more specifically, establishes communication with the external device using light such as infrared light as a wireless medium. In place of the light, another wireless medium such as radio waves, sound waves, or electromagnetic waves may be used. Incidentally, the communication with the recording apparatus 600, may be established via the network 1 instead of optical communication.

In the memory unit 512, the content guide acquired from the content guide delivery server 100 via the network 1, the available service information acquired from the service server 300, a recording/download reservation list, and so on are stored.

The ROM 503 is a read-only memory in which a program for software processing to be performed by the terminal apparatus 500 and the like are permanently stored. Incidentally, the program may be stored in the memory unit 512.

The RAM 504 is a writable volatile memory used to load a program code to be executed by the CPU 501 and write work data of the program.

The CPU 501 collectively controls the above respective units and controls data exchanges between the respective units. Further, to perform the software processing to be performed by the terminal apparatus 500, the CPU 501 loads the program from the memory unit 512 or the ROM 503 into the RAM 504, and analyzes and executes the program.

Next, the software configuration of this terminal apparatus 500 will be described using FIG. 6.

As shown in this figure, the terminal apparatus 500 includes a content guide acquisition unit 521, a content guide storage unit 522, a content guide display processing unit 523, an available service information acquisition unit 524, an available service information storage unit 525, a recording/download reservation list processing unit 527, a recording/download reservation list display processing unit 529, a recording/download reservation list storage unit 531, and a remote recording/download reservation processing unit 532.

The content guide storage unit 522, the available service information storage unit 525, and the recording/download reservation list storage unit 531 are set in the above memory unit 512 or RAM 504.

The content guide acquisition unit 521 transmits the content guide acquisition request A2 to the content guide delivery server 100 through the network 1, acquires the content guide delivered as the content guide acquisition response A3 from the content guide delivery server 100, and writes it into the content guide storage unit 522.

The available service information acquisition unit 524 transmits the available service acquisition request A31 requesting acquisition of the available service information of each recording apparatus 600 (600-A, 600-B, 600-C) installed, for example, at the user's home to the service server 300 through the network 1, acquires the available service information delivered as the available service acquisition response A34 from the service server 300, and stores it in the available service information storage unit 525. The timing when the available service information acquisition unit 524 acquires the available service information has only to be set between the time after the available service information is stored in the direct access management server 400 and the time before the content guide is displayed in the terminal apparatus 500.

The content guide display processing unit 523 performs processing of creating a content guide A4 in which contents available to each recording apparatus 600 (600-A, 600-B, 600-C) are identifiable from the content guide stored in the content guide storage unit 522 and the available service information stored in the available service information storage unit 525 and displaying it in the display unit 506.

When a content is selected and a remote recording reservation instruction A5 or a remote download reservation instruction A5' of this content is inputted by the user using the input operation unit 505 on a content guide screen displayed in the display unit 506, the recording/download reservation list processing unit 527 extracts information (recording reservation information, download reservation information) A6, A6' necessary for the remote recording reservation or the remote download reservation of the selected content from the data of the content guide stored in the content guide storage unit 522, and registers it in the recording/download reservation list stored in the recording/download reservation list storage unit 531. On the other hand, the recording/download reservation list processing unit 527 gives an issue instruction A13 of a remote recording reservation request or an issue instruction A13' of a remote download reservation request of the selected program to the remote recording/download reservation processing unit 532.

When receiving the issue instruction A13 of the remote recording reservation from the recording/download reservation list processing unit 527, the remote recording/download reservation processing unit 532 transmits the remote recording reservation request A14 including the recording reservation information to the service server 300 via the network 1, receives the remote recording reservation result notice A21 from the content provision server 200, and displays it in the display unit 506. When receiving the issue instruction A13' of the remote download reservation from the recording/download reservation list processing unit 527, the remote recording/download reservation processing unit 532 transmits the remote recording reservation request A14' including the download reservation information to the service server 300 via the network 1, receives the remote download reservation result notice A21' from the content provision server 200, and displays it in the display unit 506.

When a browsing instruction A35 of the recording/download reservation list is inputted by the user using the input operation unit 505, the recording/download reservation list display processing unit 529 reads the recording/download reservation list stored in the recording/download reservation list storage unit 531, generates display data A42 of this recording/download reservation list, and outputs it to the display unit 506.

Incidentally, it is assumed that the terminal apparatus 500 in this embodiment is a cellular phone, a portable terminal such as a PDA (Personal Digital Assistant), a personal computer, or the like. Note, however, that the terminal apparatus 500 according to the embodiment of the present invention is not limited to these devices, and may take any form as long as it has the elements shown in FIG. 5 and FIG. 6.

Figure 7:
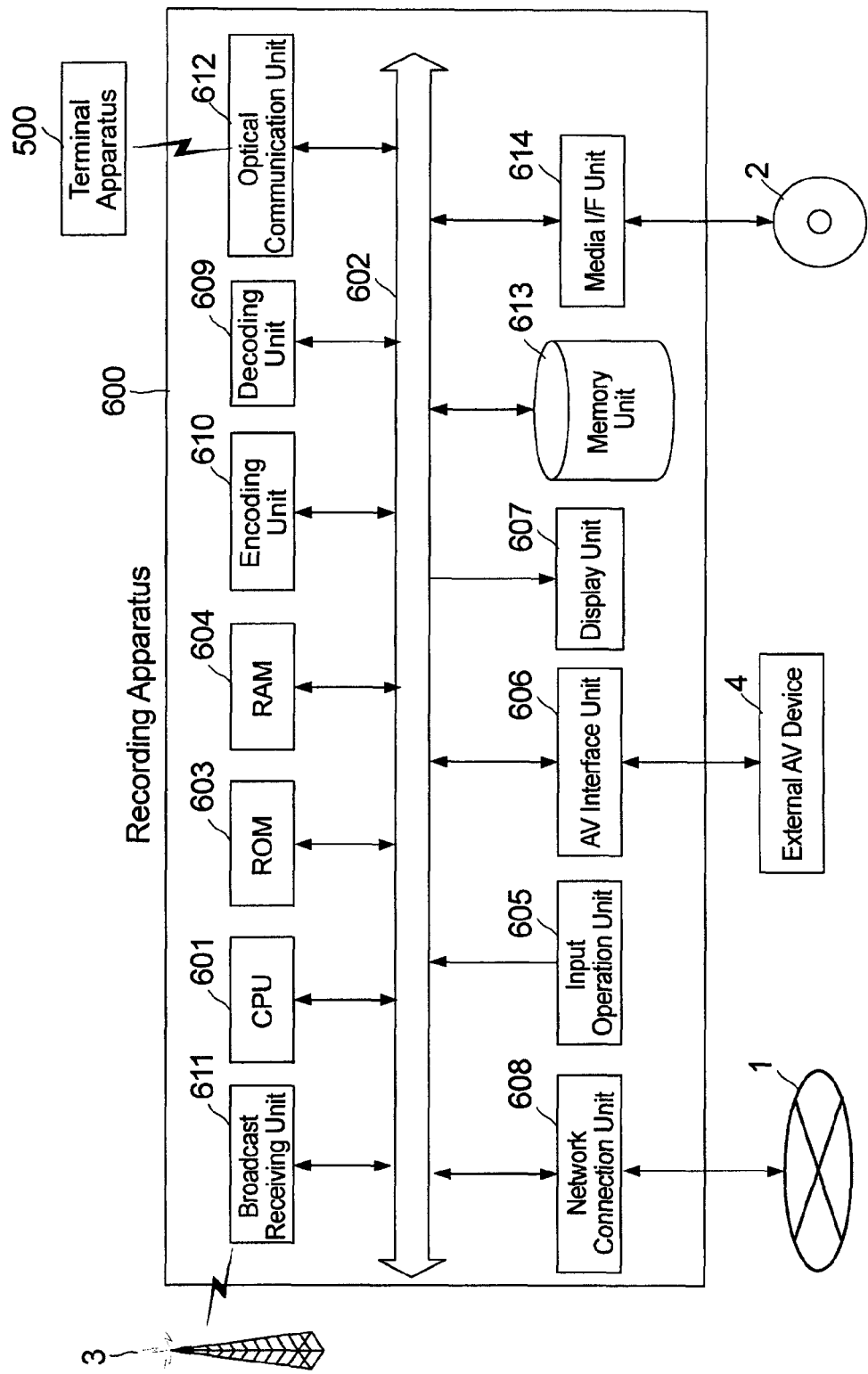
FIG. 7 is a block diagram showing the hardware configuration of a recording apparatus.

Next, the recording apparatus 600 will be described. FIG. 7 is a diagram showing the hardware configuration of the recording apparatus 600.

It is assumed that the recording apparatus 600 of this embodiment is an apparatus capable of recording and reproducing broadcast programs delivered from the content provision server 200 via the network 1 and broadcast programs broadcast from moment to moment from each broadcast station 3 such as analog terrestrial television broadcasting, digital terrestrial television broadcasting, CS digital broadcasting, or BS digital broadcasting.

As shown in this figure, a ROM 603, a RAM 604, an input operation unit 605, an AV interface unit 606, a display unit 607, a network connection unit 608, a decoding unit 609, an encoding unit 610, a broadcast receiving unit 611, an optical communication unit 612, a memory unit 613 constituted by a hard disk drive (HDD) or the like, and a media interface unit 614 are connected to a CPU 601 via a system bus 602.

The input operation unit 605 includes various keys and the like, and processes inputs of various commands for recording/reproduction from the user. The various commands inputted from the input operation unit 605 are supplied to the CPU 601 via the system bus 602 by an interface unit not shown.

The display unit 607 is constituted, for example, by a display such as an LCD and a display control circuit which drives the display, and displays, for example, confirmation of commands and data inputted by the user, various statuses, and so on.

The AV interface unit 606 processes the input and output of a video signal and an audio signal to and from an external AV device 4 such as a television connected to the recording apparatus 600.

The broadcast receiving unit 611 receives broadcast waves delivered from each broadcast station 3 such as analog terrestrial television broadcasting, digital terrestrial television broadcasting, CS digital broadcasting, BS digital broadcasting, or digital terrestrial television broadcasting for portable devices and demodulates the video signal and the audio signal.

The encoding unit 610 encodes the video signal and the audio signal of the broadcast program outputted from the broadcast receiving unit 611, for example, in an MPEG2 (Moving Picture Experts Group 2) format.

The network connection unit 608 processes the connection with the network 1.

The decoding unit 609 decodes content data acquired from the content provision server 200 via the network 1 and encoded data read from the memory unit 512 to restore video data and audio data. The restored digital video data is supplied to the AV interface unit 606 through the system bus 602 and outputted to the external AV device 4 such as the television connected to the AV interface unit 606.

The optical communication unit 612 is an interface to process communication with an external device such as the terminal apparatus 500, and more specifically, establishes communication with the external device using light such as infrared light as a wireless medium. In place of the light, another medium such as radio waves, sound waves, or electromagnetic waves may be used. Incidentally, the communication with the terminal apparatus 500 may be established via the network 1 instead of optical communication.

The memory unit 613 is a memory unit constituted by a hard disk drive or the like. In this memory unit 613, content data delivered from the content provision server 200 via the network 1, broadcast program data received by the broadcast receiving unit 611 and encoded by the encoding unit, and so on are recorded.

In the media interface unit 614, the removable medium 2 such as an optical disk can be mounted, and data of the main body of the broadcast program or the like can be recorded on this removable medium 2. Examples of the removable medium 2 are a write-once and a rewritable DVD (Digital Versatile Disk), and a Blu-ray Disc.

In the ROM 603, a program for software processing to be performed by the recording apparatus 600 and the like are stored.

To perform the software processing to be performed by the recording apparatus 600, the CPU 601 loads the necessary program from the ROM 603 into the RAM 604, and analyzes and executes the program.

Next, the software configuration regarding the remote recording/download reservation of the recording apparatus 600 will be described using FIG. 8.

As shown in this figure, the recording apparatus 600 includes a remote recording/download reservation processing unit 621, a recording/download reservation information storage unit 622, a content acquisition unit 623, a content storage unit 624, a direct access information provision unit 625, and the like. Here, the recording/download reservation information storage unit 622 and the content storage unit 624 are set in the above memory unit 613 or the removable medium 2 mounted in the media interface unit 614.

When receiving the remote recording reservation instruction A19 transmitted from the service server 300 via the network 1, the remote recording/download reservation processing unit 621 stores recording reservation information A20 included in this remote recording reservation instruction A19 in the recording/download reservation information storage unit 622, and after the completion of the storage of the recording reservation information A20, transmits the remote recording reservation result notice A21 indicating the completion of the remote recording reservation to the service server 300 via the network 1. When receiving the remote download reservation instruction A19' transmitted from the service server 300 via the network 1, the remote recording/download reservation processing unit 621 stores download reservation information A20' included in this remote download reservation instruction A19' in the recording/download reservation information storage unit 622, and after the completion of the storage of the download reservation information A20', transmits the remote download reservation result notice A21' indicating the completion of the remote download reservation to the service server 300 via the network 1.

Based on the recording reservation information or download reservation information stored in the recording/download reservation information storage unit 622, the content acquisition unit 623 selectively receives a content such as a broadcast program delivered from the content provision server 200 or a broadcast program from the broadcast station 3 and records it to the content storage unit 624, or downloads a content such as a VoD program or a file from the content provision server 200 and stores it in the content storage unit 624.

The direct access information provision unit 625 performs processing of logging into the XMPP server 414 of the direct access management server 400 to set the bidirectional always-on connection session with the direct access management server 400. Further, when receiving the direct access information acquisition request A16 from the direct access management server 400 through the always-on connection session, the direct access information provision unit 625 generates the direct access URI constituted, for example, by the global IP address and port number mapped to the local IP address and port number of the recording apparatus 600 in the router connecting the recording apparatus 600 to the network 1, and transmits the direct access information acquisition response A17 including this direct access URI to the direct access management server 400.

Next, the operation of this embodiment will be described.

It is assumed that in the direct access management server 400, links between the control device•service management IDs and the controlled device management IDs have already been completed.

Figure 6:
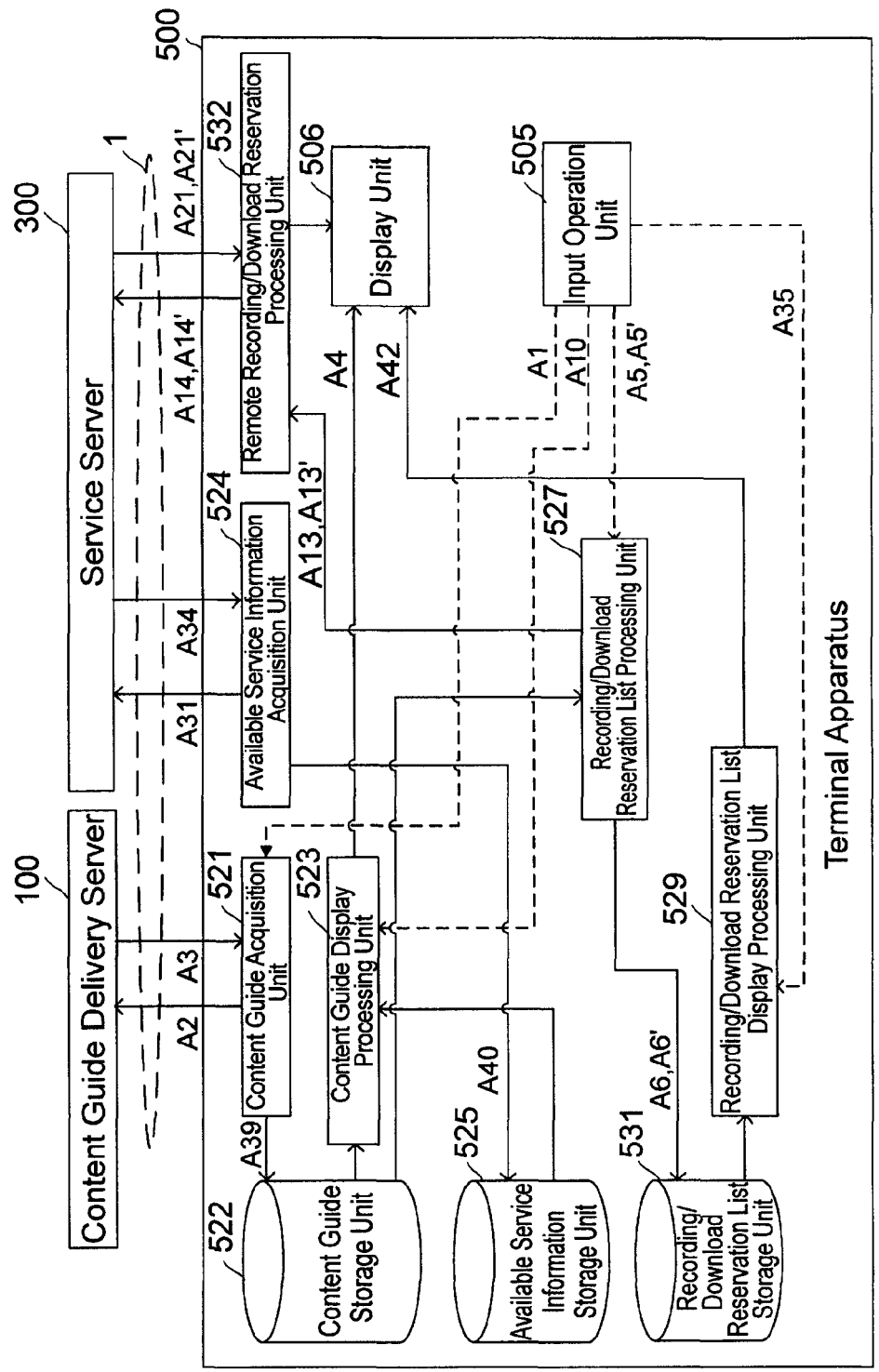
FIG. 6 is a block diagram showing the software configuration of the terminal apparatus.

First, in FIG. 6, the available service information acquisition unit 524 in the terminal apparatus 500 transmits the available service acquisition request A31 including identification information on the terminal apparatus 500 to the service server 300 through the network 1.

Figure 3:
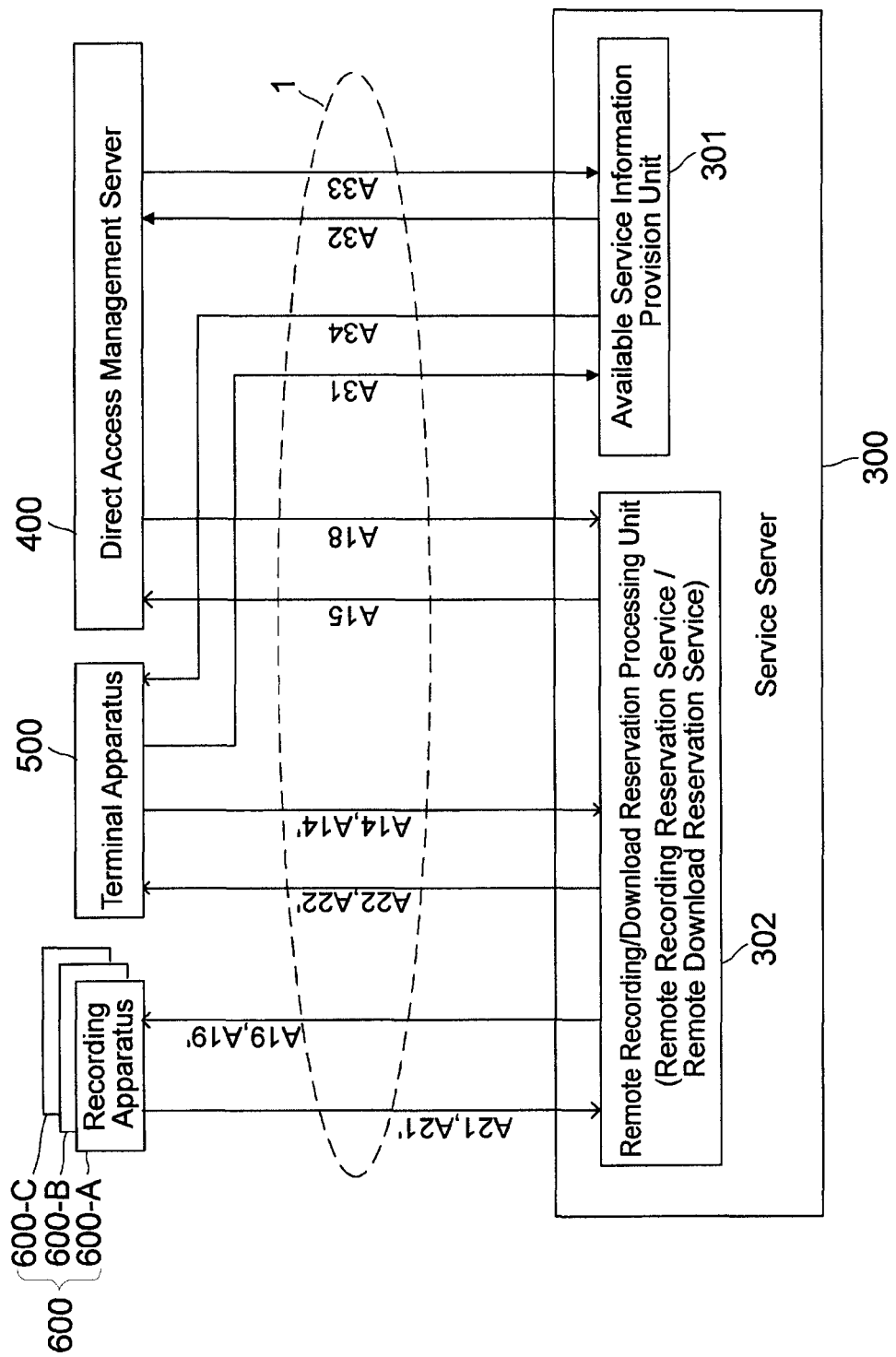
FIG. 3 is a block diagram showing the software configuration of the service server.

In FIG. 3, when receiving the available service acquisition request A31 from the terminal apparatus 500, the available service information provision unit 301 in the service server 300 determines the control device•service management ID set with respect to the combination of this terminal apparatus 500 and the service provided by the service server 300 based on the identification information on the terminal apparatus 500 included in the available service acquisition request A31. In this embodiment, the service server 300 provides two services of the remote recording reservation and the remote download reservation, so two control device•service management IDs are determined. Then, the available service information provision unit 301 transmits the available service acquisition request A32 including these two control device•service management IDs to the direct access management server 400 via the network 1.

Figure 4:
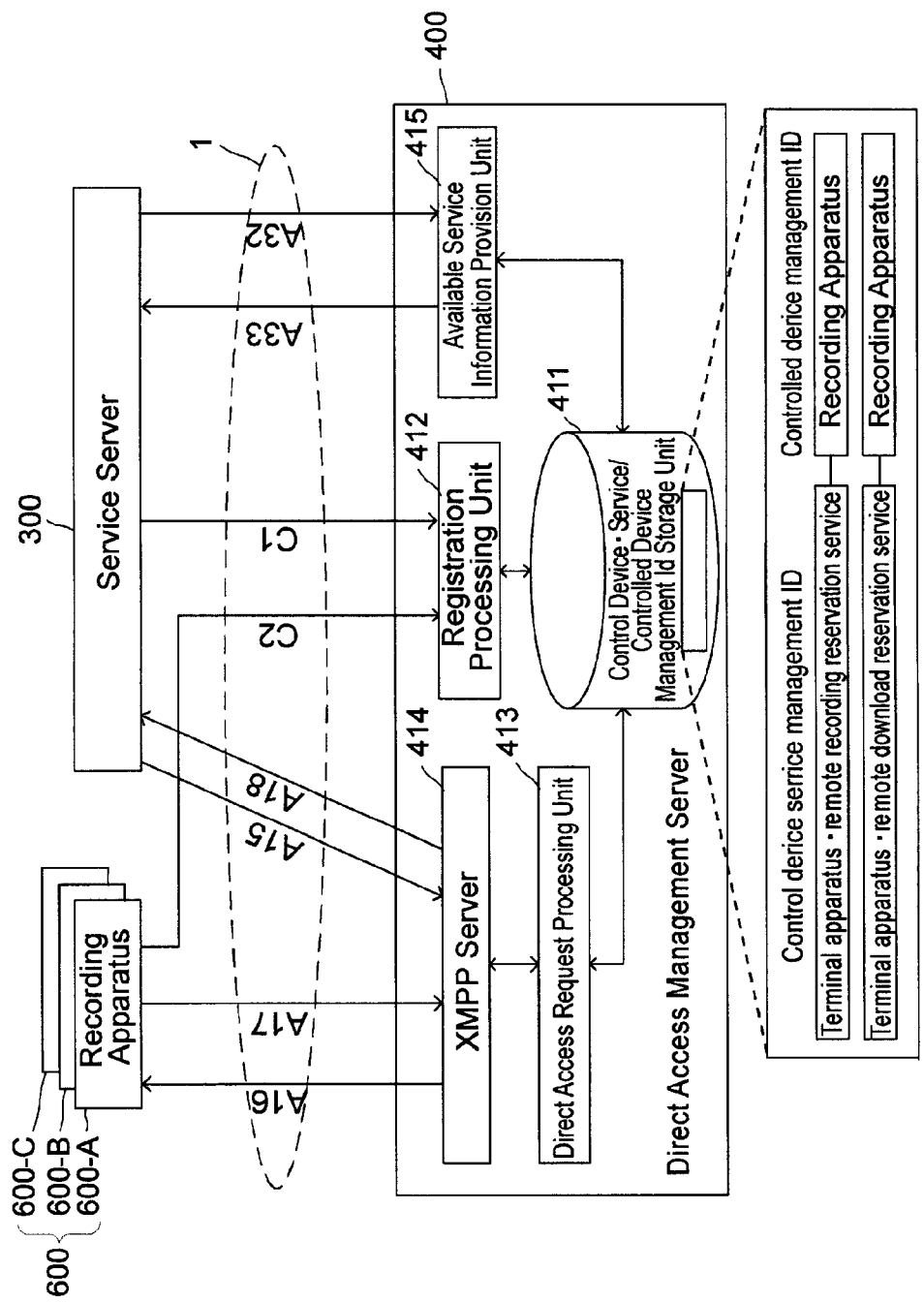
FIG. 4 is a block diagram showing the software configuration of the direct access management server.

In FIG. 4, when receiving the available service acquisition request A32 including the control device•service management IDs from the service server 300, the available service information provision unit 415 in the direct access management server 400 determines the controlled device management IDs linked with the control device•service management IDs included in the available service acquisition request A32 from within the control device•service/controlled device management ID storage unit 411, further retrieves the available service information corresponding to each of the controlled device management IDs from within the control device•service/controlled device management ID storage unit 411, and transmits it as the available service acquisition response A33 to the service server 300.

In FIG. 3, when receiving the available service information as the available service acquisition response A33 from the direct access management server 400, the available service information provision unit 301 in the service server 300 transmits this available service information as the available service acquisition response A34 to the terminal apparatus 500 via the network 1.

In FIG. 6, the available service information acquisition unit 524 in the terminal apparatus 500 acquires the available service information transmitted as the available service acquisition response A34 from the service server 300 and stores this available service information A40 in the available service information storage unit 525.

FIG. 9 is a diagram showing an example of the available service information A40 stored in the available service information storage unit 525 in the terminal apparatus 500. As shown in this figure, the available service information A40 is managed for each controlled device management ID, that is, for each recording apparatus 600. In this example, it is assumed that the service available to the recording apparatus 600-A is the "remote recording reservation", the service available to the recording apparatus 600-B is the "remote download reservation", and the service available to the recording apparatus 600-C is the "remote recording reservation" and "remote download reservation". Further, the device name is information for the user to identify the recording apparatus 600 and is automatically generated by the available service information acquisition unit 524 in the terminal apparatus 500.

Next, the operation of creating and displaying a content guide in which contents corresponding to the service available to the recording apparatus 600 are identifiable in the terminal apparatus 500 will be described.

In FIG. 6, first, the user of the terminal apparatus 500 inputs a content guide browsing instruction A1 using the input operation unit 505. When this content guide browsing instruction A1 is inputted, the content guide acquisition unit 521 in the terminal apparatus 500 transmits the content guide acquisition request A2 to the content guide delivery server 100 via the network 1. When receiving the content guide acquisition request A2, the content guide delivery server 100 transmits the content guide as the content guide acquisition response A3 to the terminal apparatus 500 via the network 1.

When receiving data of the content guide transmitted as the content guide acquisition response A3 from the content guide delivery server 100, the content guide acquisition unit 521 in the terminal apparatus 500 stores the data of this content guide in the content guide storage unit 522. When the acquisition of the content guide is completed, the content guide display processing unit 523 in the terminal apparatus 500 processes the content guide stored in the content guide storage unit 522 based on the available service information A40 stored in the available service information storage unit 525 and outputs it to the display unit 506.

Figure 10:
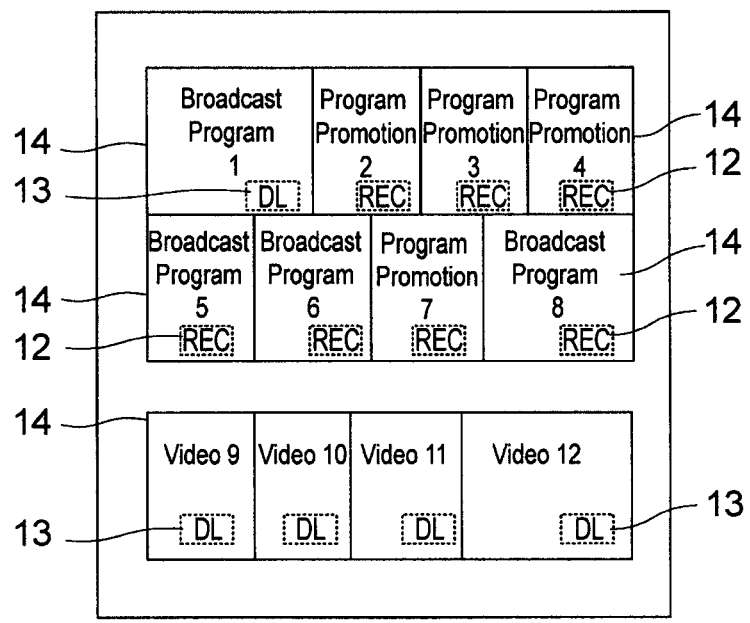
FIG. 10 is a diagram showing an example of an original content guide delivered from the content guide delivery server.

FIG. 10 is a diagram showing an example of an original content guide 11 delivered from the content guide delivery server 100.

In this example, broadcast programs, promotions of broadcast programs, and videos are used as contents. In items 14 corresponding to individual contents in the content guide 11, guidance information such as outlines of the contents appears, and information necessary for the remote recording reservation and the remote download reservation is set. Namely, in the content guide 11, contents corresponding to the remote recording reservation and contents corresponding to the remote download reservation are mixed, and in the item 14 of the content capable of the remote recording reservation, information such as a channel name, a broadcast date, broadcast start/end times, and a title being information necessary for the remote recording reservation of this content is set, whereas in the item 14 of the content capable of the remote download reservation, address information such as the URL (Uniform Resource Locator) of a source of download being information necessary for the remote download reservation of this content is set. In FIG. 10, a "REC" mark 12 is put on the item 14 of the content capable of the remote recording reservation, whereas a "download" mark 13 is put on the item 14 of the content capable of the remote download reservation, so that the kinds of services corresponding to respective contents can be identified, but in actuality, these marks may not be displayed in the content guide 11. Incidentally, the remote recording reservation for the promotion of the broadcast program does not mean the remote recording reservation of a content for the promotion, but means the remote recording reservation of the broadcast program to be promoted.

Returning to FIG. 6, the content guide display processing unit 523 in the terminal apparatus 500 creates the content guide in which contents corresponding to the service available to the recording apparatus 600 are identifiable by processing the original content guide based on the available service information A40 stored in the available service information storage unit 525.

Figure 11:
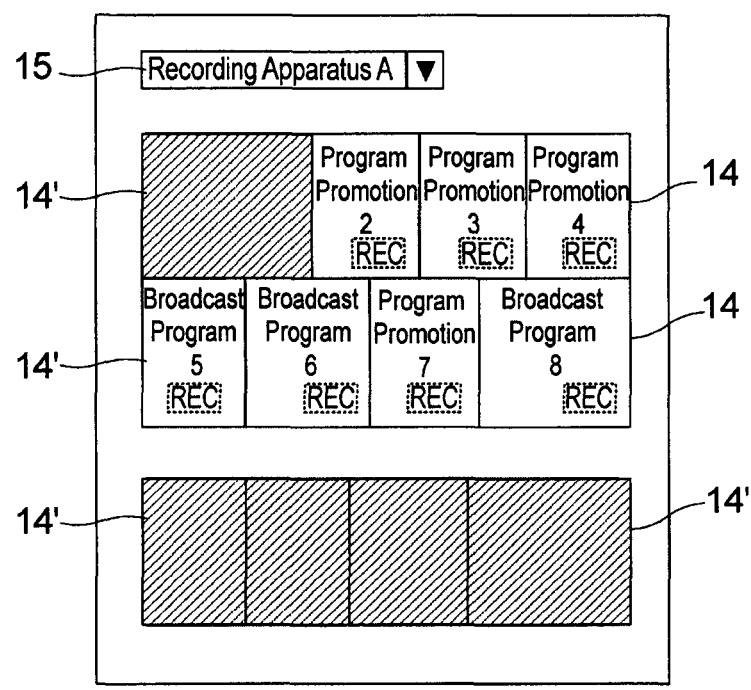
FIG. 11 is a diagram showing an example of a content guide processed in the terminal apparatus.

FIG. 11 shows an example of a content guide 21 processed by the content guide display processing unit 523. Here, a pull-down list 15 from which the recording apparatus 600 can be selected is provided in the content guide 21. This pull-down list 15 is created by the content guide display processing unit 523, based on the available service information A40 stored in the available service information storage unit 525, and created, for example, by extracting the device name in the available service information A40. The default of the device name in this pull-down list 15 is assumed to be a "recording apparatus A". This is the device name of the recording apparatus 600-A in the available service information A40 shown in FIG. 9. In this default state, the content guide display processing unit 523 determines contents corresponding to the "remote recording reservation" being the service available to the recording apparatus 600-A from the original content guide stored in the content guide storage unit 522, and creates the content guide in which these contents are identifiable.

In the example of FIG. 11, the content guide narrowed down to contents corresponding to the available service is realized by enabling the display of only the items 14 of the contents corresponding to the available service and disabling items 14' of the other contents by grayout or the like.

Incidentally, it is also possible to make contents corresponding to and not corresponding to the available service identifiable by putting an appropriate mark on the items 14 of the contents corresponding to the available service, color coding, or the like instead of disabling the display of contents other than the contents corresponding to the available service.

The user of the terminal apparatus 500 can select another device name in the pull-down list 15 using the input operation unit 505 on the screen of the content guide 21 shown in FIG. 11. Returning to FIG. 6, when another device name is selected in the pull-down list 15 by the user, a device switching instruction A10 is inputted from the input operation unit 505 to the content guide display processing unit 523.

When the device switching instruction A10 is inputted, the content guide display processing unit 523 determines the device name selected in the pull-down list 15, creates again a content guide in which contents corresponding to the service available to the recording apparatus corresponding to this device name are identifiable, and outputs it to the display unit 506.

Figure 12:
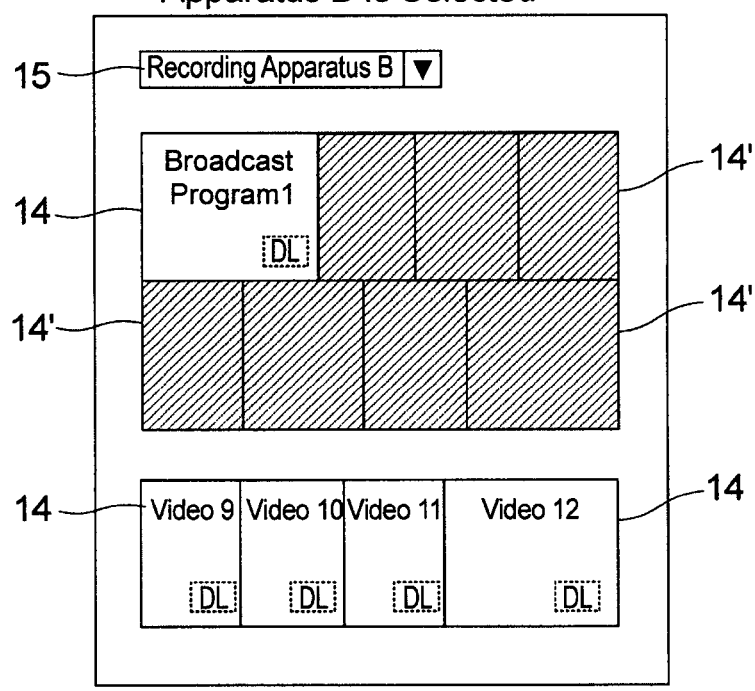
FIG. 12 is a diagram showing an example of the content guide when a recording apparatus B is selected by a user.

FIG. 12 shows an example of the content guide 21 when a "recording apparatus B" being another device name is selected in the pull-down list 15 by the user. The "recording apparatus B" is a device name of the recording apparatus 600-B in the available service information A40 shown in FIG. 9. This recording apparatus 600-B is a device permitted of only the remote download reservation, and therefore the content guide display processing unit 523 creates the content guide 21 by determining contents corresponding to the remote download reservation service, enabling the display of the items 14 of these contents, and disabling the display of the items 14' of the other contents with grayout or the like, and displays it in the display unit 506.

Figure 13:
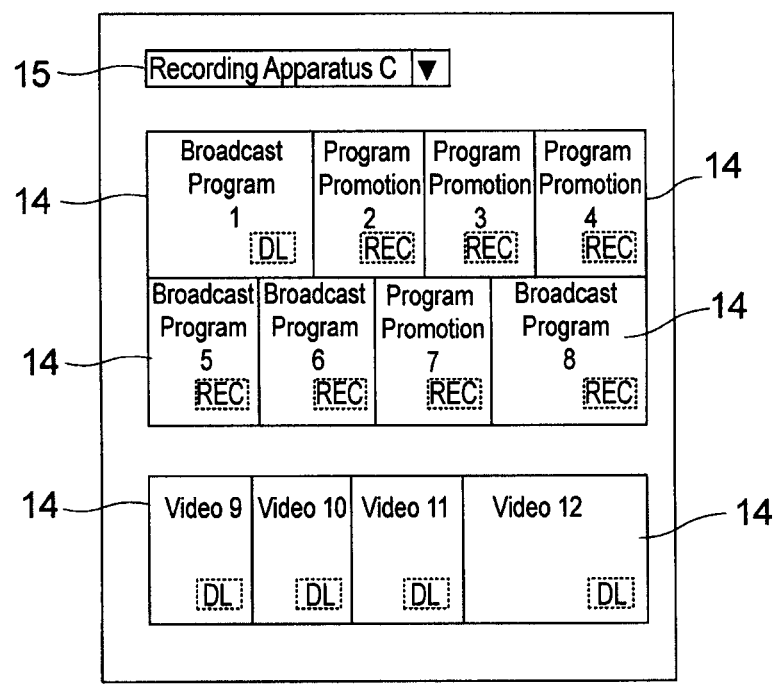
FIG. 13 is a diagram showing an example of the content guide when a recording apparatus C is selected by the user.

FIG. 13 shows an example of the content guide 21 when a "recording apparatus C" being still another device name is selected in the pull-down list 15 by the user. The "recording apparatus C" is a device name of the recording apparatus 600-C in the available service information A40 shown in FIG. 9. This recording apparatus 600-C is a device permitted of both the remote recording reservation and the remote download reservation, and therefore the content guide display processing unit 523 creates the content guide 21 by determining contents corresponding to either the remote recording reservation service or the remote download reservation service and enabling the display of the items 14 of these contents, and displays it in the display unit 506.

Thus, the user can determine contents corresponding to the service available to the recording apparatus 600 selected in the pull-down list 15 at a glance.

When the selection of a content, input of the remote recording reservation instruction A5 or the remote download reservation instruction A5' of the content, and selection of the recording apparatus 600 to be used is performed by the user in any of the above content guides 21 using the input operation unit 505, the selected content is determined by the recording/download reservation list processing unit 527 of FIG. 6.

The recording/download reservation list processing unit 527 determines the content selected on the above screen of the content guide 21, extracts the recording reservation information A6 being the information necessary for the remote recording reservation of the selected content or the download reservation information A6' being the information necessary for the remote download reservation thereof, registers it in the recording/download reservation list stored in the recording/download reservation list storage unit 531, and gives the issue instruction A13 of the remote recording reservation request or the issue instruction A13' of the remote download reservation request of the selected content to the remote recording/download reservation processing unit 532.

Incidentally, when the recording apparatus 600 to be used is selected, the recording/download reservation list processing unit 527 adds information on the selected recording apparatus 600 to the recording reservation information A6 or the download reservation information A6', registers the resultant information in the recording/download reservation list, and gives the issue instruction A13 of the remote recording reservation request or the issue instruction A13' of the remote download reservation request of the selected content to the remote recording/download reservation processing unit 532.

When receiving the issue instruction A13 of the remote recording reservation request or the issue instruction A13' of the remote download reservation request from the recording/download reservation list processing unit 527, the remote recording/download reservation processing unit 532 transmits the remote recording reservation request A14 including the recording reservation information on the content as the object of the remote recording reservation or the remote download reservation request A14' including the download reservation information on the content as the object of the remote download reservation to the service server 300 via the network 1.

In FIG. 3, when receiving the remote recording reservation request A14 or the remote download reservation request A14' from the remote recording/download reservation processing unit 532 in the terminal apparatus 500, the remote recording/download reservation processing unit 302 in the service server 300 transmits the direct access start request A15 requesting the acquisition of information (for example, the direct access URI) necessary to access the recording apparatus corresponding to the combination of the terminal apparatus 500 and its own service (remote recording reservation service or remote download reservation service) to the direct access management server 400 via the network 1. In this direct access start request A15, the control device•service management ID being the ID assigned to the combination of the terminal apparatus 500 as the control device and the remote recording reservation service or the remote download reservation service and previously registered with the service server 300 is included.

In FIG. 4, in the direct access management server 400, the XMPP server 414 to set the bidirectional always-on connection session with the recording apparatus 600 registered as the controlled device is working, and the service server 300 establishes an XMPP session with the direct access management server 400, and exchanges information with the direct access management server 400 through the XMPP session.

When receiving the direct access start request A15 from the service server 300 through the always-on connection session, the direct access request processing unit 413 in the direct access management server 400 determines the controlled device management ID linked with the control device•service management ID included in the direct access start request A15 with reference to the control device•service management ID included in the direct access start request A15 and the contents of links between the control device•service management IDs and the controlled device management IDs stored in the control device•service/controlled device management ID storage unit 411, and transmits the direct access information acquisition request A16 requesting the acquisition of information necessary for the service server 300 to directly access the recording apparatus 600 to the appropriate recording apparatus 600 via the network 1.

Figure 8:
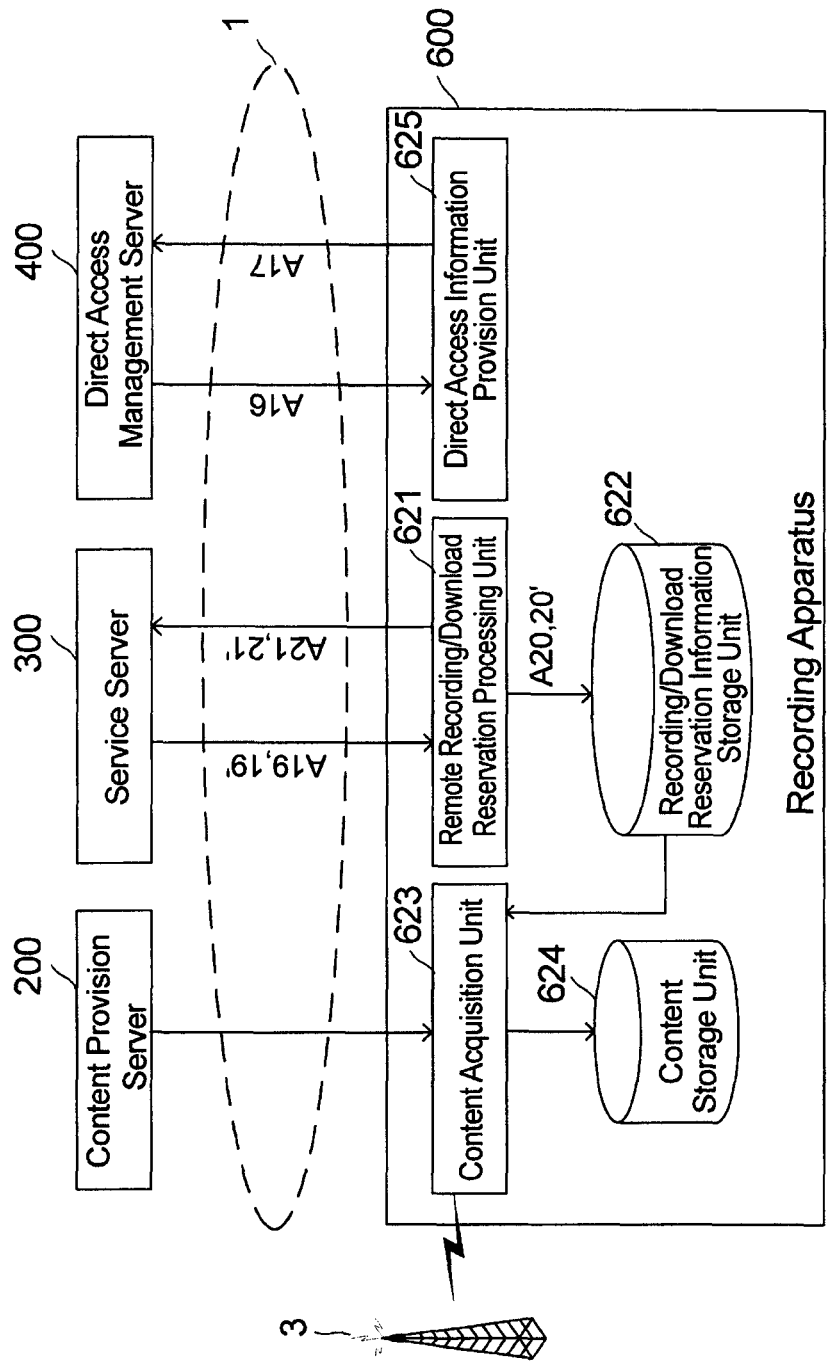
FIG. 8 is a block diagram showing the software configuration regarding a remote recording reservation/download reservation of the recording apparatus.

In FIG. 8, it is assumed that the direct access information provision unit 625 in the recording apparatus 600 has already logged into the XMPP server 414 of the direct access management server 400 and completed the setting of the bidirectional always-on connection session with the direct access management server 400. Further, in this embodiment, it is assumed that the recording apparatus 600 is connected to the network 1 through the router. When receiving the direct access information acquisition request A16 from the direct access request processing unit 413 in the direct access management server 400 through the always-on connection session, the direct access information provision unit 625 generates the direct access URI constituted, for example, by the global IP address and port number mapped to the local IP address and port number of the recording apparatus 600 in the router, and transmits it as the direct access information acquisition response A17 to the direct access management server 400 through the always-on connection session.

In FIG. 4, when receiving the direct access information acquisition response A17 from the direct access information provision unit 625 in the recording apparatus 600 through the always-on connection session, the direct access request processing unit 413 in the direct access management server 400 transmits the direct access URI included in this direct access information acquisition response A17 as the direct access start response A18 to the remote recording/download reservation processing unit 302 in the service server 300 being a source of the direct access start request.

In FIG. 3, when receiving the direct access start response A18 from the direct access request processing unit 413 in the direct access management server 400, the remote recording/download reservation processing unit 302 in the service server 300 accesses the direct access URI included in the direct access start response A18, that is, accesses the recording apparatus 600 and transmits the remote recording reservation instruction A19 including the recording reservation information or the remote download reservation instruction A19' including the download reservation information.

In FIG. 8, when receiving the remote recording reservation instruction A19 or the remote download reservation instruction A19' transmitted from the service server 300 via the network 1, the remote recording/download reservation processing unit 621 in the recording apparatus 600 stores the recording reservation information A20 included in the remote recording reservation instruction A19 or the download reservation information A20' included in the remote download reservation instruction A19' in the recording/download reservation information storage unit 622. After the completion of the storage of the recording reservation information A20 or the download reservation information A20', the remote recording/download reservation processing unit 621 transmits the remote recording reservation result notice A21 or the remote download reservation result notice A21' indicating the completion of the remote recording reservation or the completion of the remote download reservation to the service server 300 via the network 1.

In FIG. 3, when receiving the remote recording reservation result notice A21 or the remote download reservation result notice A21' from the remote recording/download reservation processing unit 621 in the recording apparatus 600, the remote recording/download reservation processing unit 302 in the service server 300 transmits the remote recording reservation result notice A22 or the remote download reservation result notice A22' to the terminal apparatus 500 being a source of the remote recording reservation request or the remote download reservation request via the network 1.

Thus, the remote recording reservation or the remote download reservation of the content selected in the content guide has been completed in the terminal apparatus 500.

In FIG. 8, in the recording apparatus 600, the content acquisition unit 623 selectively receives a program sent by IP multicast broadcasting or the like from the content provision server 200 via the network 1, or a program sent by broadcast waves from each broadcast station 3 such as analog terrestrial television broadcasting, digital terrestrial television broadcasting, CS digital broadcasting, BS digital broadcasting, or digital terrestrial television broadcasting for portable devices based on the recording reservation information stored in the recording/download reservation information storage unit 622, and records it to the content storage unit 624. Moreover, in the recording apparatus 600, by transmitting a download request of a content to the content provision server 200 via the network 1 based on the download reservation information stored in the recording/download reservation information storage unit 622, the content acquisition unit 623 downloads data of this content and records it to the content storage unit 624. The content whose remote recording reservation or remote download reservation is thus made by the user of the terminal apparatus 500 is recorded to the recording apparatus 600.

As described above, according to this embodiment, the content guide in which contents corresponding to the service available to the recording apparatus 600 are identifiable is displayed in the terminal apparatus 500, which improves the efficiency and operability when the user selects a content to be the object of the use of the service such as the remote recording reservation or the remote download reservation on the content guide.

Further, by creating the content guide narrowed down to contents corresponding to the available service, for example, by disabling the display of contents other than the contents corresponding to the available service, a non-corresponding content can be prevented from being mistakenly selected by the user.

Furthermore, when a plurality of recording apparatuses 600 (600-A, 600-B, 600-C) are connected to the network 1, the content guide narrowed down by enabling the display of only contents corresponding to the service available to each of the recording apparatuses 600 (600-A, 600-B, 600-C) is created and displayed, so, for example, even when the user specifies the recording apparatus 600 and wants to use the service such as the remote recording reservation or the remote download reservation, the efficiency and operability when the user selects a content to be the object of the use of the service improve.

Incidentally, in the above embodiment, the case where there are a plurality of recording apparatuses 600 associated with the terminal apparatus 500 is described, but when there is one recording apparatus 600 associated with the terminal apparatus 500, the pull-down list 15 on the screen of the content guide 21 shown in, for example, FIG. 11 is unnecessary, and only a content guide in which contents corresponding to the service available to this recording apparatus 600 are identifiable is created.

Next, another example of the display method of the content guide in the terminal apparatus 500 will be described.

In the above embodiment, when a plurality of recording apparatuses 600 (600-A, 600-B, 600-C) are connected to the network 1, content guides in which contents corresponding to the services available to the respective recording apparatuses 600 (600-A, 600-B, 600-C) are identifiable are created and individually displayed by switching among them, but the contents of the content guides of the respective recording apparatuses 600 (600-A, 600-B, 600-C) may be integrated into one content guide and displayed.

Figure 14:
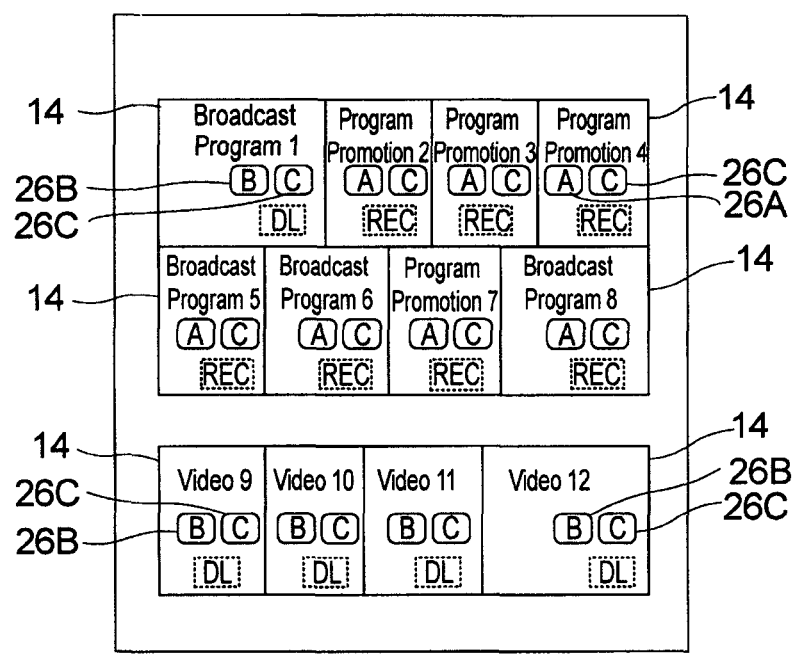
FIG. 14 is a diagram showing an example of a content guide into which content guides of respective recording apparatuses are integrated.

FIG. 14 is a diagram showing an example of a content guide 24 after the integration. Here, a "broadcast program 1" being a content at an upper left end is a content corresponding to the remote download reservation service and not corresponding to the remote recording reservation service. According to the available service information A40 shown in FIG. 9, recording apparatuses corresponding to the remote download reservation service are the "recording apparatus B" and the "recording apparatus C", and hence, marks 26B and 26C respectively representing device names of the "recording apparatus B" and the "recording apparatus C" as available recording apparatuses are added in the item 14 of the content of the "broadcast program 1".

Moreover, a "program promotion 4" being a content at an upper right end is a content corresponding to the remote recording reservation service and not corresponding to the remote download reservation service. According to the available service information A40 shown in FIG. 9, recording apparatuses corresponding to the remote recording reservation service are the "recording apparatus A" and the "recording apparatus C", and hence, marks 26A and 26C respectively representing device names of the "recording apparatus A" and the "recording apparatus C" as available recording apparatuses are displayed in the item 14 of the content of the "program promotion 4".

As just described, in this embodiment, by creating and displaying the content guide 24 clearly demonstrating the recording apparatuses 600 enabled to use services corresponding to respective contents by the content guide display processing unit 523 in the terminal apparatus 500, the efficiency and operability when the user selects a significant content as the object of the use of the service such as the remote recording reservation or the remote download reservation improve. Further, even when the user specifies the recording apparatus 600 and wants to use the service such as the remote recording reservation or the remote download reservation, the efficiency and operability when the user selects a content to be the object of the use of the service improve.

Figure 15:
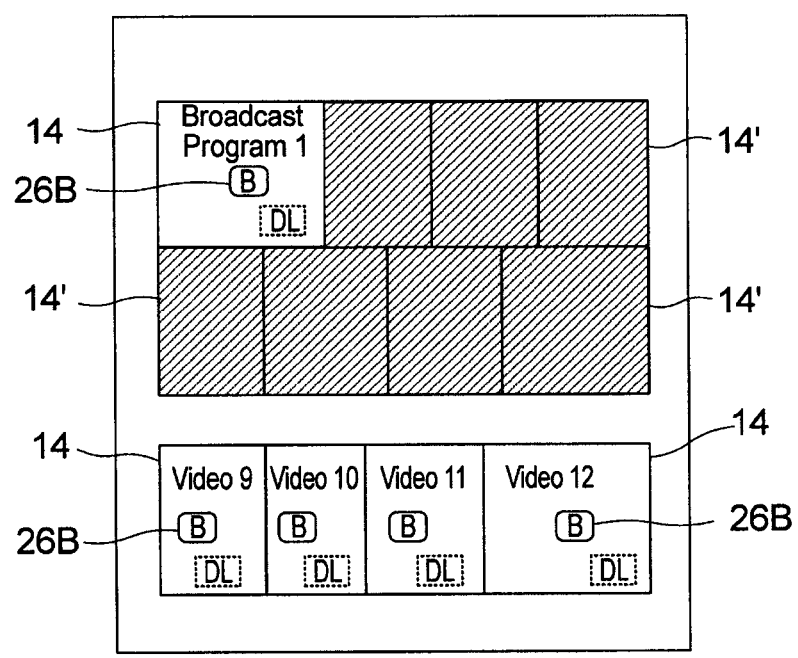
FIG. 15 is a diagram showing an example of the content guide narrowed down to contents corresponding to the remote download reservation service in FIG. 14.

Furthermore, when no recording apparatus enabled to use the remote recording reservation service is connected to the network 1 although the recording apparatus enabled to use the remote download reservation service is connected, as shown in FIG. 15, a content guide in which contents corresponding to the remote download reservation service are identifiable may be created by enabling only the display of the items 14 of contents corresponding to the remote download reservation service and disabling the display of the items 14' of contents corresponding to only the remote recording reservation service by grayout or the like. The same goes for the case where no recording apparatus enabled to use the remote download reservation service is connected to the network 1 although the recording apparatus enabled to use the remote recording reservation service is connected, and in this case, a content guide narrowed down to contents corresponding to the remote recording reservation service is created by disabling the display of contents corresponding to only the remote download reservation service.

Next, a modified example of the above embodiment will be described.

In the above embodiment, the service server 300 transmits the remote recording reservation instruction A19 or the remote download reservation instruction A19' to the recording apparatus 600 based on the direct access URI acquired from the direct access management server 400, but if the terminal apparatus 500 acquires the direct access URI from the service server 300 via the network 1, the remote recording reservation instruction A19 or the remote download reservation instruction A19' may be transmitted from the terminal apparatus 500 to the recording apparatus 600.

Further, in the above embodiment, the service server 300 exclusive to the remote recording reservation service and the remote download reservation service is used, but the content guide delivery server 100 or the content provision server 200 can be used as a service server by installing software to perform the remote recording reservation service and the remote download reservation service on the content guide delivery server 100 or the content provision server 200.

Furthermore, in the above embodiment, the service server 300 and the direct access management server 400 are implemented by separate server apparatuses, but by installing the software of the service server 300 and the software of the direct access management server 400 on one server apparatus, the service server 300 and the direct access management server 400 may be integrated into one server.

Moreover, in the above embodiment, the description is given with a focus on the remote recording reservation and the remote download reservation as services provided by the service server 300, but the present invention is not limited to these services, and any service other than the remote recording reservation and the remote download reservation can be treated in the same manner as long as the service is a service to record a content on the network or a broadcast content to the recording apparatus 600.

It is, of course, to be understood that the present invention is not intended to be limited only to the above embodiment and various changes may be made therein without departing from the spirit of the present invention.

What is claimed is:

1. A network system in which a terminal apparatus, plural recording apparatuses, and a server apparatus are configured to connect to each other via a network, the network system comprising:

the server apparatus including
  a service processing unit implemented by a first circuitry configured to perform a service of reserving recording of a content on one of the recording apparatuses in response to a reservation request from the terminal apparatus, and
  an available service information provision unit implemented by the first circuitry configured to
    manage available service information for each of the recording apparatuses indicating whether each respective recording apparatus performs a service selected from a group consisting of: a remote recording reservation, a remote download reservation, and a combination thereof, and
    transmit the available service information to the terminal apparatus in response to an available service acquisition request from the terminal apparatus; and the terminal apparatus including
  a content guide acquisition unit implemented by a second circuitry configured to acquire content guide listing information, the content guide listing information being used to generate a content guide which lists information to guide watching and listening of a plurality of contents, wherein the content guide listing information corresponds to one or more of broadcast content and video on demand (VOD) content,
  an available service information acquisition unit implemented by the second circuitry configured to acquire the available service information from the server apparatus, and
  a content guide display processing unit implemented by the second circuitry configured to
    generate the content guide corresponding to a first recording apparatus and a second recording apparatus, of the plural recording apparatuses, by identifying the content guide listing information, acquired by the content guide acquisition unit, that is available to be recorded and downloaded by the first and second recording apparatuses, based on the available service information corresponding to the first and second recording apparatuses, and
    generate the content guide such that when the available service information indicates that the first recording apparatus performs at least the remote recording reservation and the second recording apparatus performs at least the remote download reservation, the content guide information corresponding to the remote recording reservation of the first recording apparatus is integrated, in the content guide, with the content guide information corresponding to the remote download reservation of second recording apparatus, wherein the content guide includes a graphical indication identifying which of the first recording apparatus and the second recording apparatus is capable of performing the service corresponding to each of the respective content guide information included in the content guide.

2. The network system as set forth in claim 1, wherein the content guide display processing unit is further configured to generate the content guide such that when the available service information indicates that the first recording apparatus and the second recording apparatus only performs one of the remote recording reservation and the remote download reservation, the content guide display processing unit narrows the content guide listing information to include only the content guide information corresponding to the available service of the first and second recording apparatuses.

3. The network system as set forth in claim 2, wherein the content guide display processing unit is further configured to generate the content guide such that the content guide includes an indication that the contents, of the plurality of contents, corresponding to the available service of the first and second recording apparatuses are enabled.

4. The network system as set forth in claim 2, wherein the content guide display processing unit is further configured to generate the content guide such that the content guide includes an indication that contents, of the plurality of contents, corresponding to the unavailable service of the first and second recording apparatuses are disabled.

5. A server apparatus configured to connect to a terminal apparatus and plural recording apparatuses via a network, the server apparatus comprising:

a service processing unit implemented by circuitry configured to perform a service of reserving recording of a content on one of the recording apparatuses in response to a reservation request from the terminal apparatus; and
an available service information provision unit implemented by the circuitry configured to
  manage available service information for each of the recording apparatuses indicating whether each respective recording apparatus performs a service selected from a group consisting of: a remote recording reservation, a remote download reservation, and a combination thereof, and
  transmit the available service information to the terminal apparatus in response to an available service acquisition request from the terminal apparatus, the terminal apparatus being configured to generate a content guide corresponding to a first recording apparatus and a second recording apparatus, of the plural recording apparatuses, by identifying content guide listing information that is available to be recorded and downloaded by the first and second recording apparatuses, based on the available service information corresponding to the first and second recording apparatuses, wherein
the content guide listing information corresponds to one or more of broadcast content and video on demand (VOD) content,
the content guide is generated such that when the available service information indicates that the first recording apparatus, performs at least the remote recording reservation and the second recording apparatus performs at least the remote download reservation, the content guide information corresponding to the remote recording reservation of the first recording apparatus is integrated, in the content guide, with the content guide information corresponding to the remote download reservation of second recording apparatus, wherein the content guide includes a graphical indication identifying which of the first recording apparatus and the second recording apparatus is capable of performing the service corresponding to each of the respective content guide information included in the content guide.

6. A terminal apparatus configured to connect with a server apparatus and plural recording apparatuses via a network, the terminal apparatus comprising:
   a content guide acquisition unit implemented by circuitry configured to acquire content guide listing information, the content guide listing information being used to generate a content guide which lists information to guide watching and listening of a plurality of content, wherein the content guide listing information corresponds to one or more of broadcast content and video on demand (VOD) content;
   an available service information acquisition unit implemented by the circuitry configured to acquire available service information from the server apparatus, the available service information indicating whether each respective recording apparatus performs a service selected from a group consisting of: a remote recording reservation, a remote download reservation, and a combination thereof, the server apparatus being configured to perform a service of reserving recording of a content on one of the recording apparatuses connected via the network in response to a reservation request from the terminal apparatus, to manage the available service information for each of the recording apparatuses, and to transmit the available service information to the terminal apparatus in response to an available service acquisition request from the terminal apparatus; and
   a content guide display processing unit implemented by the circuitry configured to
      generate the content guide corresponding to a first recording apparatus and a second recording apparatus, of the plural recording apparatuses, by identifying the content guide listing information, acquired by the content guide acquisition unit, that is available to be recorded and downloaded by the first and second recording apparatuses, based on the available service information, corresponding to the first and second recording apparatuses, and
      generate the content guide such that when the available service information indicates that the first recording apparatus performs at least the remote recording reservation and the second recording apparatus performs at least the remote download reservation, the content guide information corresponding to the remote recording reservation of the first recording apparatus is integrated, in the content guide, with the content guide information corresponding to the remote download reservation of the second recording apparatus, wherein the content guide includes a graphical indication identifying which of the first recording apparatus and the second recording apparatus is capable of performing the service corresponding to each of the respective content guide information included in the content guide.

7. The terminal apparatus as set forth in claim 6, wherein the content guide display processing unit is configured to generate the content guide in which contents that are acquirable by the remote recording reservation or the remote download reservation performed by the first and second recording apparatuses are identifiable from the displayed content guide.

8. The terminal apparatus as set forth in claim 6, wherein the content guide display processing unit is configured to generate the content guide in which contents that are acquirable by the remote recording reservation or the remote download reservation performed by the first and second recording apparatuses are identifiable from the displayed content guide.

9. The terminal apparatus as set forth in claim 6, wherein the content guide display processing unit is configured to generate the content guide in which display of only contents that are acquirable by the remote recording reservation or the remote download reservation performed by the first and second recording apparatuses are enabled in the displayed content guide.

10. The terminal apparatus as set forth in claim 6, wherein the content guide display processing unit is configured to generate the graphical indication based on controlled device management IDs included in the available service information corresponding to the first and second recording apparatuses.

11. The terminal apparatus as set forth in claim 6, wherein the remote recording reservation and the remote download reservation are performed by the first and second recording apparatuses.

12. The terminal apparatus as set forth in claim 6, wherein the information listed in the content guide includes information to guide watching and listening of a plurality of contents acquirable by the remote download reservation and a plurality of contents acquirable by the remote recording reservation.

13. A method for displaying a content guide, comprising:
   connecting a terminal apparatus, plural recording apparatuses, and a server apparatus via a network;
   performing, by a service processing unit of the server apparatus, a service of reserving recording of a content on one of the recording apparatuses in response to a reservation request from the terminal apparatus;
   managing, by an available service information provision unit of the server apparatus, available service information for each of the recording apparatuses indicating whether each respective recording apparatus performs a service selected from a group consisting of: a remote recording reservation, a remote download reservation, and a combination thereof;
   transmitting the available service information to the terminal apparatus in response to an available service acquisition request from the terminal apparatus;
   acquiring, by a content guide acquisition unit of the terminal apparatus, content guide listing information, the content guide listing information being used to generate a content guide which lists information to guide watching and listening of a plurality of contents, wherein the content guide listing information corresponds to one or more of broadcast content and video on demand (VOD) content;
   acquiring, by an available service information acquisition unit of the terminal apparatus, the available service information from the server apparatus;
   generating, by a content guide display processing unit of the terminal apparatus, the content guide corresponding to a first recording apparatus and a second recording apparatus, of the plural recording apparatuses by identifying the content guide listing information, acquired by the content guide acquisition unit, that is available to be recorded and downloaded by the first and second recording apparatuses, based on the available service information corresponding to the first and second recording apparatuses, wherein the content guide is generated such that when the available service information indicates that the first recording apparatus performs at least the remote recording reservation and the second recording apparatus performs the remote download reservation, the content guide information corresponding to the remote recording reservation of the first recording apparatus is integrated, in the content guide, with the content guide information corresponding to the remote download reservation of second recording apparatus, wherein the content guide includes a graphical indication identifying which of the first recording apparatus and the second recording apparatus is capable of performing the service corresponding to each of the respective content guide information; and displaying the generated content guide.

14. A non-transitory computer-readable storage medium storing program for a server apparatus configured to connect with a terminal apparatus and plural recording apparatuses via a network, which when executed by a computer, causes the computer to perform a method comprising:

performing, by a service processing unit, a service of reserving recording of a content on one of the recording apparatuses in response to a reservation request from the terminal apparatus;

managing, by an available service information provision unit, available service information for each of the recording apparatuses indicating whether each respective recording apparatus performs a service selected from a group consisting of: a remote recording reservation, a remote download reservation, and a combination thereof; and transmitting the available service information to the terminal apparatus in response to an available service acquisition request from the terminal apparatus via the network, the terminal apparatus being configured to generate a content guide corresponding to a first recording apparatus and a second recording apparatus, of the plural recording apparatuses, by identifying content guide listing information that is available to be recorded and downloaded by the first and second recording apparatuses, based on the available service information corresponding to the first and second recording apparatuses, wherein the content guide listing information corresponds to one or more of broadcast content and video on demand (VOD) content, and the content guide is generated such that when the available service information indicates that the first recording apparatus performs at least the remote recording reservation and the second recording apparatus performs the remote download reservation, the content guide information corresponding to the remote recording reservation of the first recording apparatus is integrated, in the content guide, with the content guide information corresponding to the remote download reservation of second recording apparatus, wherein the content guide includes a graphical indication identifying which of the first recording apparatus and the second recording apparatus is capable of performing the service corresponding to each of the respective content guide information.

15. A non-transitory computer-readable storage medium storing a program for a terminal apparatus configured to connect with a server apparatus and plural recording apparatuses via a network, which when executed by a computer, causes the computer to perform a method comprising:

acquiring, by a content guide acquisition unit, content guide listing information, the content guide listing information being used to generate a content guide which lists information to guide watching and listening of a plurality of contents, wherein the content guide listing information corresponds to one or more of broadcast content and video on demand (VOD) content;

acquiring, by an available service information acquisition unit, available service information from the server apparatus, the available service information indicating whether each respective recording apparatus performs a service selected from a group consisting of: a remote recording reservation, a remote download reservation, and a combination thereof;

generating, by a content guide display processing unit, the content guide corresponding to a first recording apparatus and a second recording apparatus, of the plural recording apparatuses, by identifying the content guide listing information, acquired by the content guide acquisition unit, that is available to be recorded and downloaded by the first and second recording apparatuses, based on the available service information, corresponding to the first and second recording apparatuses, wherein the content guide is generated such that when the available service information indicates that the first recording apparatus performs at least the remote recording reservation and the second recording apparatus performs at least the remote download reservation, the content guide information corresponding to the remote recording reservation of the first recording apparatus is integrated, in the content guide, with the content guide information corresponding to the remote download reservation of second recording apparatus, wherein the content guide includes a graphical indication identifying which of the first recording apparatus and the second recording apparatus is capable of performing the service corresponding to each of the respective content guide information; and displaying the generated content guide.

* * * * *